United States Patent
Sudo

(10) Patent No.: US 8,976,134 B2
(45) Date of Patent: Mar. 10, 2015

(54) CHARACTER INPUT DEVICE AND CHARACTER INPUT METHOD

(75) Inventor: Tomohiro Sudo, Yokohama (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 186 days.

(21) Appl. No.: 13/640,790

(22) PCT Filed: Apr. 14, 2011

(86) PCT No.: PCT/JP2011/059273
§ 371 (c)(1),
(2), (4) Date: Nov. 9, 2012

(87) PCT Pub. No.: WO2011/129398
PCT Pub. Date: Oct. 20, 2011

(65) Prior Publication Data
US 2013/0050125 A1  Feb. 28, 2013

(30) Foreign Application Priority Data
Apr. 14, 2010 (JP) ................... 2010-093533

(51) Int. Cl.
G09G 5/00 (2006.01)
G06F 3/0488 (2013.01)

(52) U.S. Cl.
CPC .................... G06F 3/04886 (2013.01)
USPC ........... 345/173; 345/156; 715/773; 715/756; 715/860

(58) Field of Classification Search
CPC ............... G06F 3/0481–3/0487; G06F 1/1626
USPC .......... 345/156, 173; 715/773, 863, 856, 857, 715/858, 860, 862
See application file for complete search history.

(56) References Cited

U.S. PATENT DOCUMENTS

| 7,706,616 | B2 * | 4/2010 | Kristensson et al. | ......... 382/187 |
| 2005/0146508 | A1 | 7/2005 | Kirkland et al. | |
| 2007/0040813 | A1 * | 2/2007 | Kushler et al. | ................ 345/173 |

(Continued)

FOREIGN PATENT DOCUMENTS

| JP | 2000267808 A | 9/2000 |
| JP | 2003141448 A | 5/2003 |
| JP | 2005196759 A | 7/2005 |

(Continued)

OTHER PUBLICATIONS

International Search Report and Written Opinion corresponding to PCT/JP2011/059273, dated Jul. 5, 2011.

Primary Examiner — Jennifer Nguyen
(74) Attorney, Agent, or Firm — Lowe Hauptman & Ham, LLP

(57) ABSTRACT

According to an aspect, a character input device includes: a touch panel capable of detecting touches on a plurality of points; and a control unit for displaying a plurality of buttons on the touch panel and determining whether a first touch gesture in which a touch position with respect to the touch panel is continuously changed occurs. When detecting occurrence of a second touch gesture being a further touch on a different area from an area where the first touch gesture occurs while the first touch gesture occurs in the area where the buttons are displayed, the control unit is configured to receive, as an input, a character corresponding to the button corresponding to the touch position of the first touch gesture when the second touch gesture occurs.

12 Claims, 16 Drawing Sheets

(56) References Cited

U.S. PATENT DOCUMENTS

2008/0316183 A1* 12/2008 Westerman et al. .......... 345/173
2009/0193366 A1* 7/2009 Davidson ..................... 715/863

FOREIGN PATENT DOCUMENTS

| | | |
|---|---|---|
| JP | 2008108233 A | 5/2008 |
| JP | 2008257551 A | 10/2008 |

* cited by examiner

| CHARACTER | Wa | Ra | Ya | ⋯ |
|---|---|---|---|---|
| x | 10 | 32 | 54 | ⋯ |
| y | 10 | 10 | 10 | ⋯ |
| WIDTH | 20 | 20 | 20 | ⋯ |
| HEIGHT | 40 | 40 | 40 | ⋯ |

FIG.12

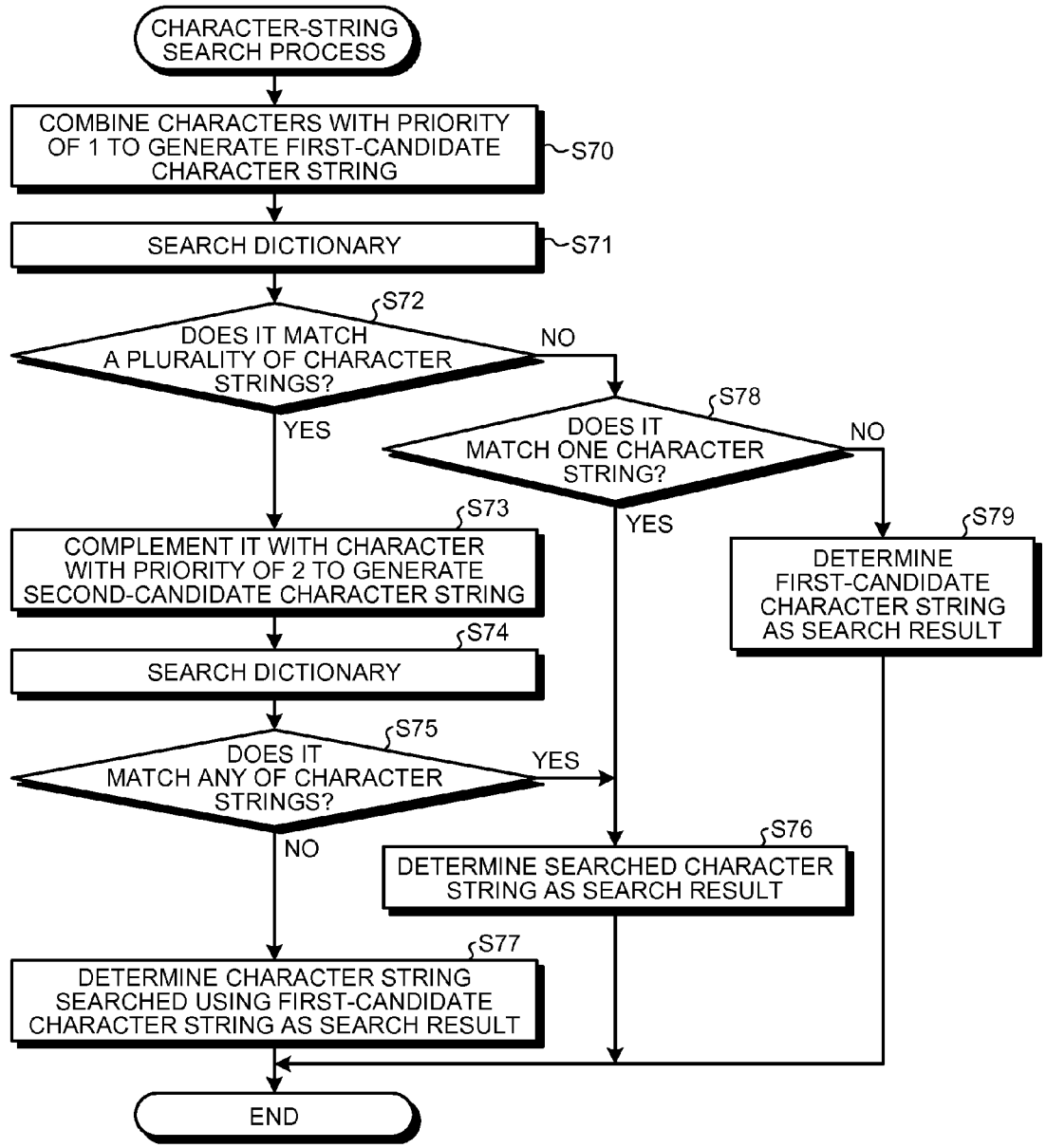

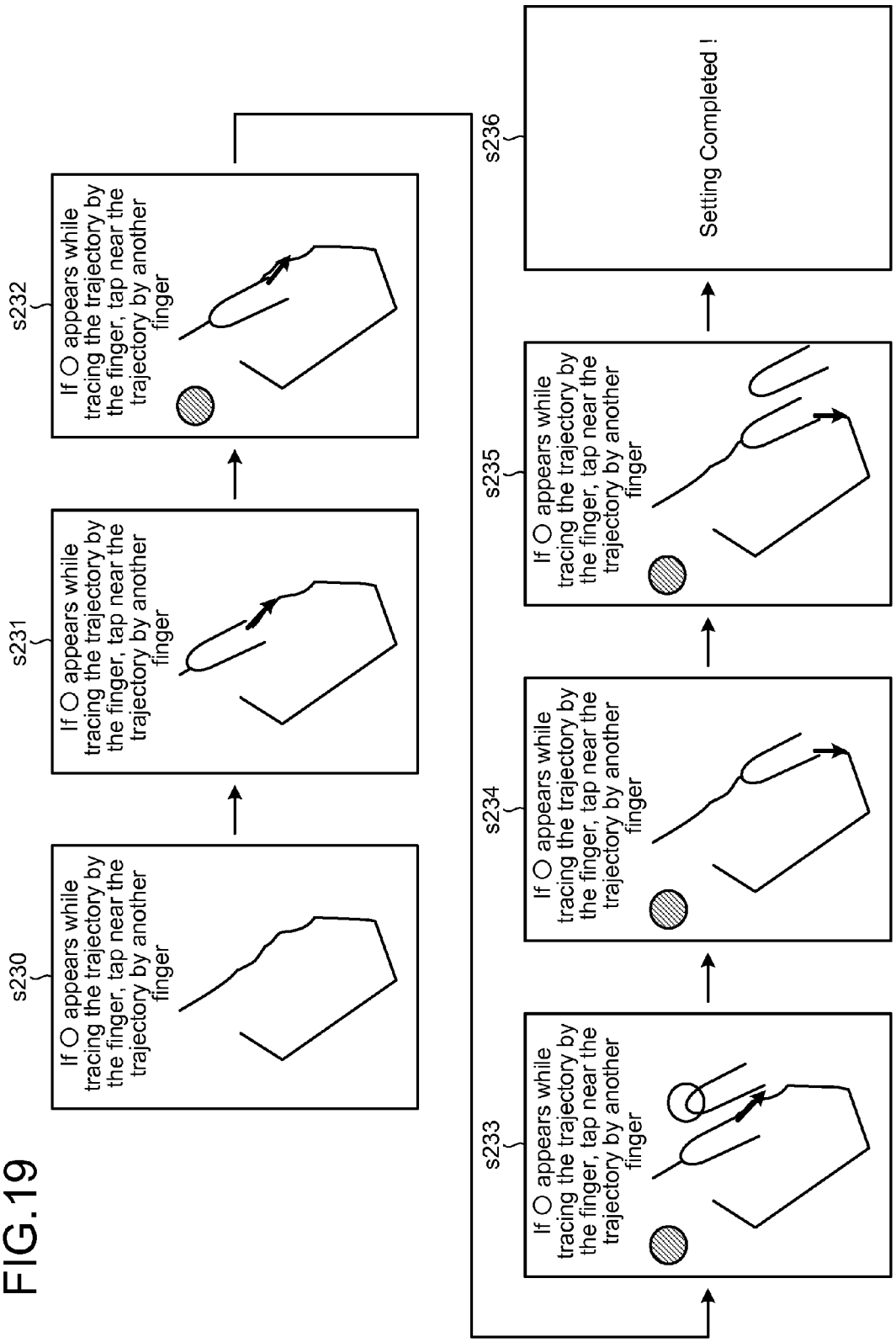

CHARACTER INPUT DEVICE AND CHARACTER INPUT METHOD

CROSS-REFERENCE TO RELATED APPLICATION

This application is a National Stage of PCT international application Ser. No. PCT/JP2011/059273 filed on Apr. 14, 2011 which designates the United States, and which is based upon and claims the benefit of priority from Japanese Patent Application No. 2010-093533, filed on Apr. 14, 2010.

FIELD

The present disclosure relates to a character input device and a character input method.

BACKGROUND

Recently, touch panels are widely used in order to enable intuitive operation and achieve a compact character input device without a device such as a keyboard requiring a physically large area. As a technology for inputting a character using a touch panel, a technology for inputting a handwritten character on the touch panel (e.g., Patent Literature 1) and a technology for inputting a character using a virtual keyboard displayed on the touch panel (hereinafter, "virtual keyboard") (e.g., Patent Literature 2) are known.

CITATION LIST

Patent Literature

Patent Literature 1: JP-A-2003-141448
Patent Literature 2: JP-A-2008-108233

TECHNICAL PROBLEM

However, the conventional technology for inputting a handwritten character on the touch panel has some problems that fast character input is difficult because it takes time to perform inputs and character recognition process. The conventional technology for inputting characters using a virtual keyboard has also difficulty in fast character input because it is necessary to repeat finger's up and down operations on the touch panel for each key corresponding to a character desired to be input.

For the foregoing reasons, there is a need for a character input device and a character input method that allow fast character input on a touch panel.

SUMMARY

According to an aspect, a character input device includes: a touch panel capable of detecting touches on a plurality of points; and a control unit for displaying a plurality of buttons on a display surface of the touch panel and determining whether a first touch gesture in which a touch position with respect to the touch panel is continuously changed occurs. When detecting occurrence of a second touch gesture being a further touch on a different area from an area where the first touch gesture occurs while it is determined that the first touch gesture occurs in the area where the buttons are displayed, the control unit is configured to receive, as an input, a character corresponding to the button displayed according to the touch position of the first touch gesture when the second touch gesture occurs.

According to another aspect, the control unit is configured to additionally display the character on the button corresponding to the touch position of the first touch gesture in the different area, and detect a touch on the additional display as the second touch gesture.

According to another aspect, the control unit is configured to display the additional display at positions, each time the touch position detected by the first touch gesture changes, each of which is equally spaced with respect to each of the touch positions.

According to another aspect, the control unit is configured to further receive, as an input, a character corresponding to a button displayed at a position where a specific operation is detected by the first touch gesture, among characters corresponding to buttons on a trajectory connecting positions where touches are detected by the first touch gesture.

According to another aspect, the specific operation is a start of a touch in the first touch gesture.

According to another aspect, the specific operation is an end of a touch in the first touch gesture.

According to another aspect, the specific operation is a change of a movement direction of the touch position in the first touch gesture.

According to another aspect, the specific operation is a movement of the touch position which draws a trajectory of a specific shape in the first touch gesture.

According to another aspect, the control unit is configured to determine whether a character string, in which a character corresponding to a button where the touch occurs by the first touch gesture upon detection of the second touch gesture is combined with a character corresponding to a button displayed at a position where the specific operation is detected, is appropriate. When it is detected that the character string is not appropriate, the control unit receives a character string complemented with a character corresponding to button which is other than the button where the touch occurs by the first touch gesture upon detection of the second touch gesture and which is other than the button where the specific operation is detected, as an input.

According to another aspect, the control unit is configured to compare a character string in which characters corresponding to buttons displayed at positions where the specific operation is detected are combined with each other with a dictionary, and receive, when a matched character string is searched, a searched character string as an input.

According to another aspect, the control unit is configured to associate weighting information with each of characters corresponding to buttons where touches occur by the first touch gesture, and give higher priority to a character associated with weighting information having a large value, to specify an input character string.

According to another aspect, the control unit is configured to associate a character corresponding to a button where a touch occurs by the first touch gesture upon detection of the second touch gesture with weighting information greater than that of a character corresponding to a button where the touch occurs by the first touch gesture but the second touch gesture is not detected.

According to another aspect, a character input method is executed by a character input device with a touch panel capable of detecting touches on a plurality of points. The character input method includes: in a control unit of the character input device, displaying a plurality of buttons on a display surface of the touch panel; in the touch panel, detecting occurrence of a first touch gesture in which a touch position continuously changes and a second touch gesture being a further touch on a different area from an area where the first touch gesture occurs while it is determined that the first touch gesture occurs in the area where the buttons are displayed; and in the control unit of the character input device, receiving, as an input, a character corresponding to the button displayed according to the touch position of the first touch gesture when the second touch gesture occurs.

ADVANTAGEOUS EFFECTS OF INVENTION

The character input device and the character input method according to the present invention allow fast character input on a touch panel.

BRIEF DESCRIPTION OF DRAWINGS

FIG. 10 is a diagram illustrating an example of virtual keyboard data.

FIG. 12 is a diagram illustrating an example of an input character buffer.

FIG. 17 is a flowchart illustrating a procedure of a character-string search process.

FIG. 18 is a diagram illustrating an example of the temporary buffer when priority is subdivided.

FIG. 19 is a diagram illustrating an example of a setting process of a tap area.

DESCRIPTION OF EMBODIMENTS

Exemplary embodiments of the present invention will be explained in detail below with reference to the accompanying drawings. It should be noted that the present invention is not limited by the following explanation. In addition, the components in the explanation below include those which are easily thought of by persons skilled in the art, those which are substantially equivalents, and those in a scope of so-called equivalents. In the followings, the mobile phone will be explained as an example of a character input device; however, a target to which the present invention is applied is not limited to the mobile phone. Therefore, the present invention is also applicable to various devices provided with a touch panel such as PHSs (Personal Handy-phone Systems), PDAs (Personal Digital Assistants), portable navigation devices, personal computers, and gaming devices.

EMBODIMENTS

Figure 1:
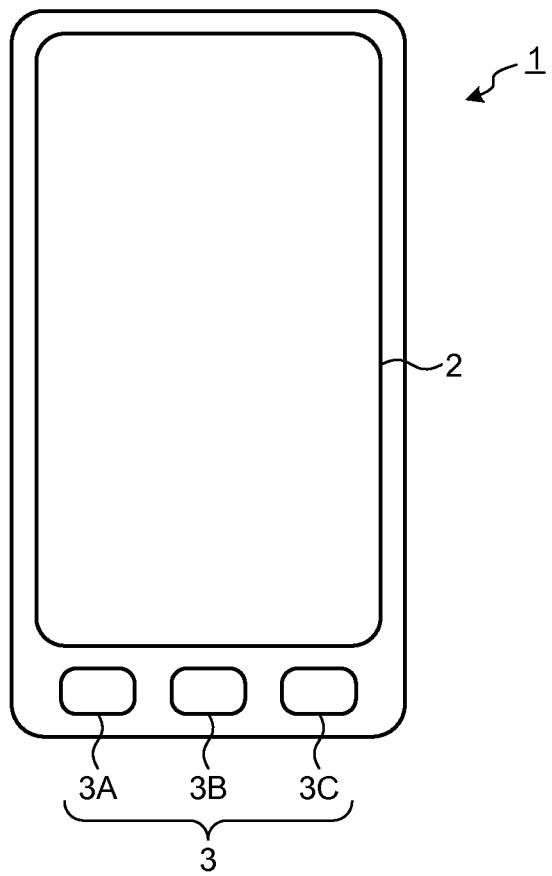
FIG. 1 is a front view of an appearance of a mobile phone.

FIG. 1 is a front view of an appearance of a mobile phone 1 which is an embodiment of a character input device according to the present invention. The mobile phone 1 includes a touch panel 2, and an input unit 3 formed from a button 3A, a button 3B, and a button 3C. The touch panel 2 displays characters, graphics, images, and so on, and detects touches (contacts) performed on the touch panel 2 using a finger, a stylus, a pen, or so (hereinafter, "finger"). The touch panel 2 is a so-called multi-touch panel capable of detecting inputs to a plurality of points. When any of the buttons is pressed, the input unit 3 activates a function corresponding to the pressed button.

Figure 2:
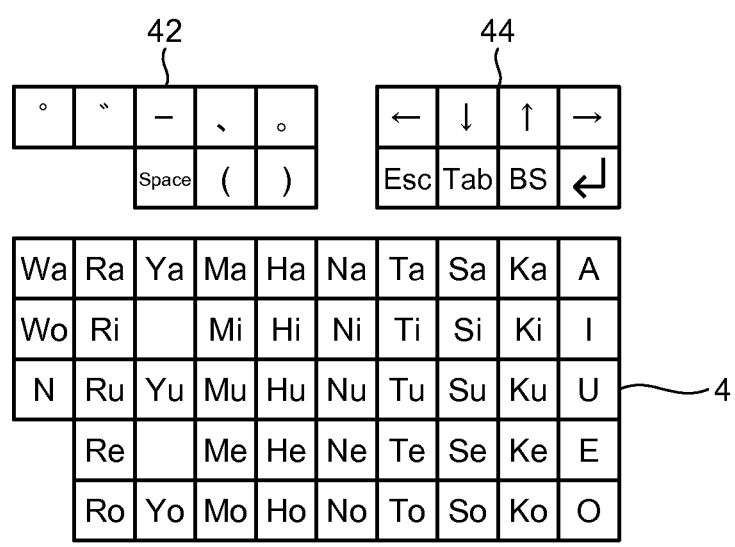
FIG. 2 is a diagram illustrating a virtual keyboard displayed on a touch panel.

To receive a character input from a user, as illustrated in FIG. 2, the mobile phone 1 displays a virtual keyboard 4 on the touch panel 2. FIG. 2 is a diagram illustrating the virtual keyboard displayed on the touch panel. The virtual keyboard 4 includes a plurality of virtual buttons resembling keys of a physical keyboard. For example, when the user performs a gesture of placing (touching) his/her finger on the button of "A" in the virtual keyboard 4 and releasing the finger therefrom, the gesture is detected through the touch panel 2, and the mobile phone 1 receives a character of "A" as an input. To receive a character input from the user, the mobile phone 1 displays additional virtual keyboards 42 and 44 on the touch panel 2. The additional virtual keyboards 42 and 44 include a plurality of virtual keyboards resembling various types of keys that are not displayed on the virtual keyboard 4. The additional virtual keyboards 42 and 44 include various types of keys other than Kana-characters. Specifically, the additional virtual keyboard 42 includes "o", "", "-", ",", ".", and the like. The additional virtual keyboard 44 includes "←", "↑", "↓", "→", and the like.

The mobile phone 1 further receives inputs of characters performed on the virtual keyboard 4 by a continuous method. The continuous method is a method in which the user moves the finger across the virtual keyboard 4 while keeping in contact with the touch panel 2 to allow continuous inputs of a plurality of characters. In the continuous method, for example, by sliding the finger in the order of a button "A", a button "Ka", a button "Ta", and a button "Ma" while keeping in contact with the touch panel 2, the user can input a character string of "AKaTaMa".

In this way, in the continuous method, the characters can be input only by sliding the finger across the touch panel 2 instead of performing upward and downward gestures of the finger in each button, which enables significantly high-speed character input.

In the continuous method, however, it is necessary to determine whether the user intentionally touches each of the buttons on a trajectory along which he/she moves the finger in order to input a character corresponding to the button, or the user causes the finger to merely pass across the buttons in order to move the finger onto another button. For example, it is assumed that the layout of the virtual keyboard 4 is a layout of AIUEO keyboard (a layout of 50 hiragana characters in Japanese, in which "AIUEO" are vertically laid out and "AKaSaTaNa" are horizontally laid out) and that the user wants to input a word of "AKaTaMa". In this case, when the user's finger moves from the button "A" to the button "Ma", the finger passes through buttons "Ka", "Sa", "Ta", "Na", and "Ha" between the above two buttons. Because of this, if it cannot be determined that the finger does not intentionally touch the buttons "Sa", "Na", and "Ha", then, despite user's intentions, a character string of "AKaSaTaNaHaMa" is received as an input.

Therefore, the mobile phone 1 displays a tap area corresponding to the button touched by the finger on the touch panel 2. Specifically, the mobile phone 1 displays a character corresponding to the button touched by the finger in the tap area. The mobile phone 1 determines that the user intentionally touches a button, among the buttons on the trajectory along which the user moves the finger, displayed at a position where a touch (tap) on the tap area is detected through the touch panel 2 in order to input a character. Specifically, when a touch on the tap area is detected through the touch panel 2 while the finger touch position is moved, it is determined that the button at the finger touch position is intentionally touched. The tap area according to the present embodiment is an area corresponding to the position touched by the user's finger. Therefore, when the finger touch position is moved, the tap area is moved. The display position of the tap area can be preset by setting or so.

Moreover, when a gesture of starting a finger touch is detected through the touch panel 2 and there is a button at the position where the start of the touch is detected, the mobile phone 1 determines that the button is intentionally touched. Further, when a gesture of terminating a finger movement and releasing the finger from the touch panel 2 is detected through the touch panel 2 and there is a button at the position where the termination of the touch is detected, the mobile phone 1 determines that the button is intentionally touched.

Figure 3:
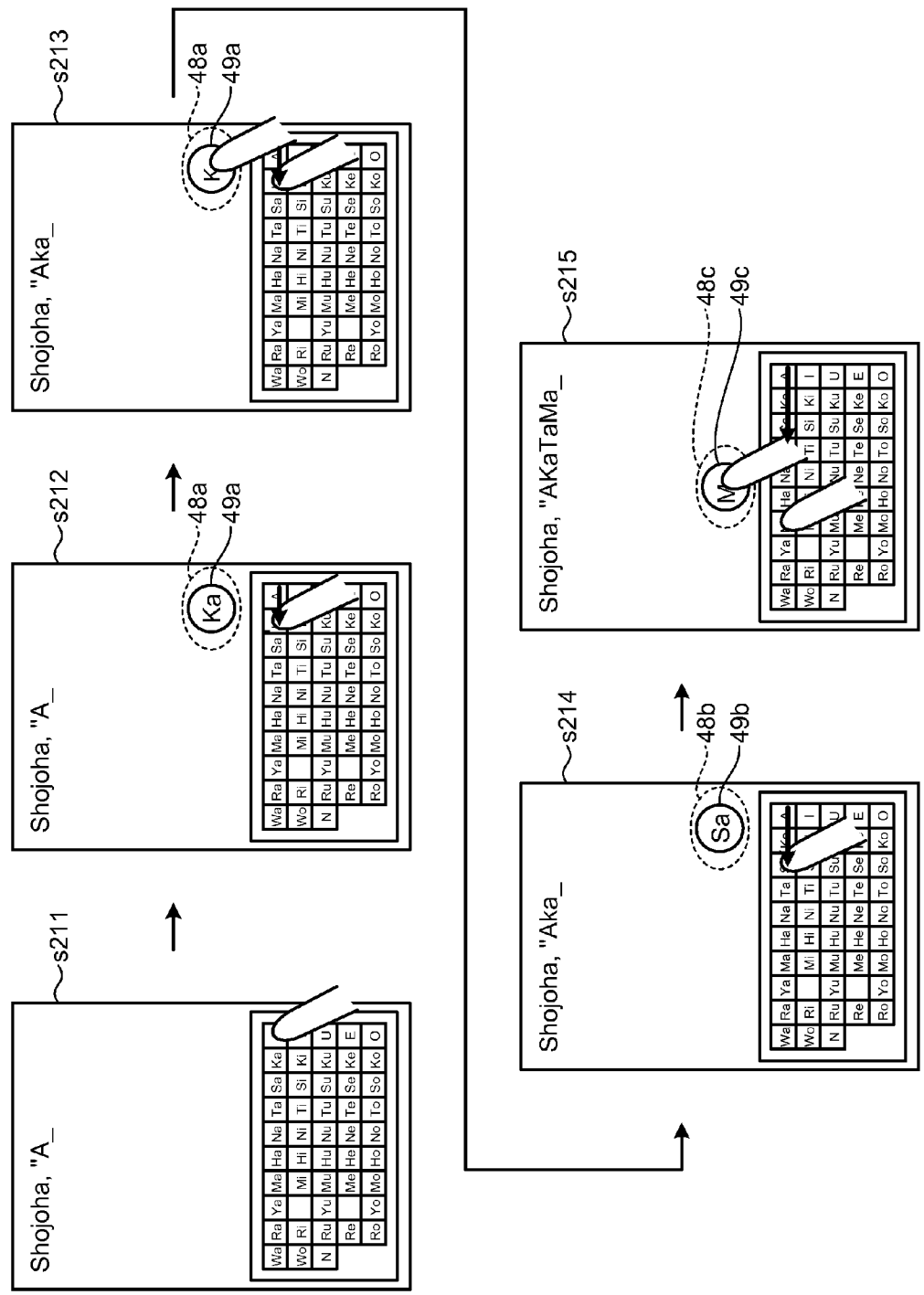
FIG. 3 is a diagram illustrating an operation example of a character input.

An operation example when the user inputs "AKaTaMa" to the mobile phone 1 is illustrated in FIG. 3. In the example of FIG. 3, the display of the additional virtual keyboards 42 and 44 is omitted. At s211, the finger is placed in an area of the button "A" and touches the touch panel 2. In this case, the mobile phone 1 determines that the button "A" where the finger is placed is intentionally touched.

At s212, the finger moves from the button "A" to the button "Ka" while keeping in contact with the touch panel 2. In this case, the mobile phone 1 displays an image 49a of "Ka" in a tap area 48a corresponding to the button "Ka" touched by the finger.

At s213, the tap area 48a is touched by another finger while the finger keeps in contact with the button "Ka" of the touch panel 2. In this case, the mobile phone 1 detects a touch on the tap area 48a and determines that the button "Ka" is intentionally touched.

At s214, the finger moves from the button "Ka" to the button "Sa" while keeping in contact with the touch panel 2. In this case, the mobile phone 1 displays an image 49b of "Sa" in a tap area 48b corresponding to the button "Sa" touched by the finger. When a touch on the tap area 48b is not detected during passage of the finger across the button "Sa" while keeping in contact with the touch panel 2, the mobile phone 1 determines that the button "Sa" is not intentionally touched.

At s215, the finger moves from the button "Sa" to the button "Ma" while keeping in contact with the touch panel 2. In this case, the mobile phone 1 displays an image 49c of "Ma" in a tap area 48c corresponding to the button "Ma" touched by the finger. In this case, however, another finger touches the tap area during passage of the finger across the button "Ta". This allows the mobile phone 1 to determine that the button "Ta" is intentionally touched.

At s215, the tap area 48c is touched by another finger. In this case, the mobile phone 1 detects the touch on the tap area 48c and determines that the button "Ma" is intentionally touched.

With these operations, the mobile phone 1 determines that the buttons are intentionally touched in the order of "A", "Ka", "Ta", and "Ma", and receives "AKaTaMa", in which the characters corresponding to these buttons are combined with each other in chronological order, as an input character string. The character string coincides with a character string that the user intends to input.

As illustrated in FIG. 3, the mobile phone 1 determines with high accuracy whether each of the buttons, on the trajectory along which the user's finger moves while keeping in contact with the touch panel 2, is intentionally touched by the finger or the finger merely passes across the button based on a tap gesture input by another finger, and receives an input of the character. That is, when detecting another touch (tap gesture) on an area (second area) different from an area (first area) where a touch being moved by the finger kept in contact with the touch panel 2 is detected, the mobile phone 1 receives a character corresponding to the button in the area, where the touch being moved by the finger kept in contact with the touch panel 2 is detected, as an input character. This enables the mobile phone 1 to make determination with high accuracy and receive an input of a character even when the finger is moving while keeping in contact with the touch panel 2. Therefore, the user can input characters to the mobile phone 1 accurately and at high speed.

A larger area than the button can be used as a tap area, and, therefore, the probability that user's inputting error to the button may occur can be reduced. In other words, because the mobile phone 1 can specify a button based on a trajectory along which the user's finger is moving while keeping in contact with the touch panel 2, the probability of inputting a key different from a desired key can be reduced more than a case where the finger touches a button each time. This allows the user to input characters more accurately and at higher speed.

The tap areas may be located at equally spaced positions with respect to positions (finger touch positions) touched by the finger drawing a trajectory. Even if the position touched by the finger drawing the trajectory is moved, it is set so that a relation between each tap area and the position touched by the finger drawing the trajectory is equally spaced (i.e. constant), and this makes it easier for the user to tap the tap area.

The mobile phone 1 may determine whether, in addition to the tap gesture, a button is intentionally touched by the finger or the finger merely passes across the button based on a natural gesture of the user (specific operation). A case in which an input to the button is determined based on a natural gesture of the user (specific operation) will be explained below with reference to FIG. 4 to FIG. 8.

Figure 4:
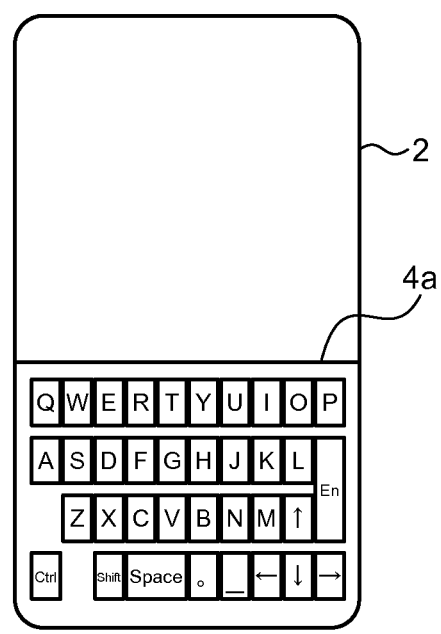
FIG. 4 is a diagram illustrating a virtual keyboard displayed on the touch panel.

The mobile phone 1 displays a virtual keyboard 4a on the touch panel 2, as illustrated in FIG. 4, in order to receive a character input from the user. The virtual keyboard 4a includes a plurality of virtual buttons resembling keys of a physical keyboard. The virtual keyboard 4a according to the present embodiment is a keyboard with buttons (keys) in QWERTY layout.

The mobile phone 1 determines that a button, among the buttons on the trajectory along which the user moves the finger, displayed at a position where a specific operation is detected through the touch panel 2 is intentionally touched by the user in order to input a character. Specifically, when a gesture of starting a finger touch is detected through the touch panel 2 and there is a button at the position where the start of the touch is detected, the mobile phone 1 determines that the button is intentionally touched. Moreover, when a gesture of terminating the finger movement and releasing the finger from the touch panel 2 is detected through the touch panel 2 and there is a button at a position where the termination of the touch is detected, the mobile phone 1 determines that the button is intentionally touched.

When the gesture of changing the moving direction with the finger kept in contact with the touch panel 2 is detected through the touch panel 2 and there is a button at the position where the change of the moving direction is detected, the mobile phone 1 determines that the button is intentionally touched. Specifically, the mobile phone 1 compares the moving direction when the finger enters the button with the moving direction when the finger exits the button, and determines that, if an angular difference between the moving directions is greater than a threshold, the user intentionally touches the button.

Figure 5:
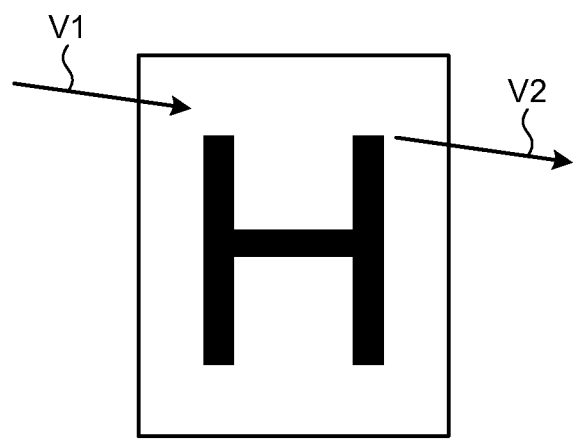
FIG. 5 is a diagram illustrating an example of how a finger is passing across a button area.
Figure 6:
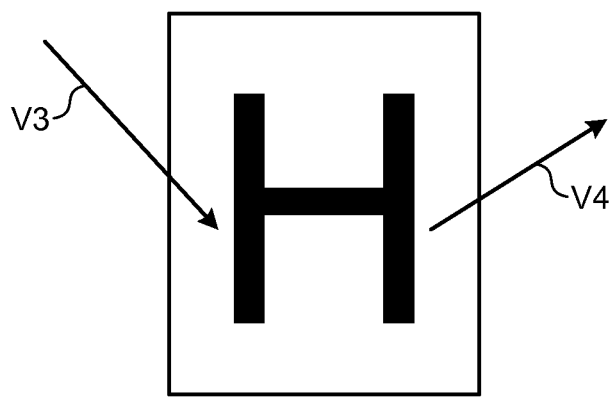
FIG. 6 is a diagram illustrating an example in which a moving direction of the finger is changed in the button area.

This is because, when the finger is just passing across the button during moving to another button, it is considered that the finger moves across the button in a certain direction and therefore an angular difference between V1 indicating a moving direction (vector) upon the entrance and V2 indicating a moving direction upon the exit becomes small as illustrated in FIG. 5. This is also because, as illustrated in FIG. 6, when an angular difference between V3 indicating a moving direction upon the entrance and V4 indicating a moving direction upon the exit is large, it is more likely to change the moving direction in order that the user intentionally touches the button and then touches another button. That is, it can be determined that the button is one of target buttons.

Figure 7:
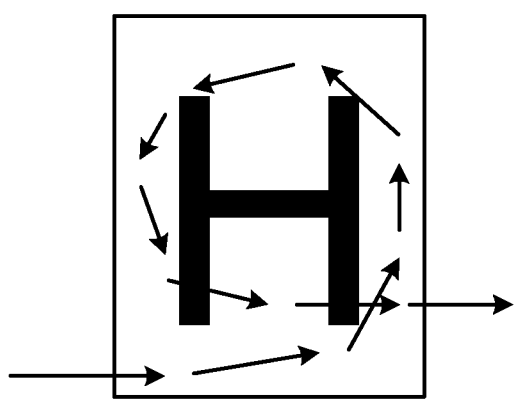
FIG. 7 is a diagram illustrating an example of drawing a trajectory along which the finger turns in the button area.

As illustrated in FIG. 7, when a gesture of moving the finger while drawing a trajectory that turns in a button area while keeping in contact with the touch panel 2 is detected through the touch panel 2, the mobile phone 1 determines that the user intentionally touches the button. This is because if the finger is just passing across the button, it is not expected that the finger moves while drawing such a trajectory. When not only the trajectory that turns but also a trajectory of a characteristic shape such as a mountain-like shape and a wave-like shape is drawn by the finger in the button area, it may be determined that the user intentionally touches the button.

In this way, when a finger movement of drawing the trajectory of the characteristic shape in the button area is detected, it is determined that the button is intentionally touched, and this enables the user to easily and continuously input the same character. For example, if the user wants to continuously input a character "W" three times, the user has only to move the finger so as to draw a circle three times in a button area of "W". For example, by counting one turn each time the total of angles of a finger movement vector in the button area exceeds 360 degrees, the number of turns can be counted.

Figure 8:
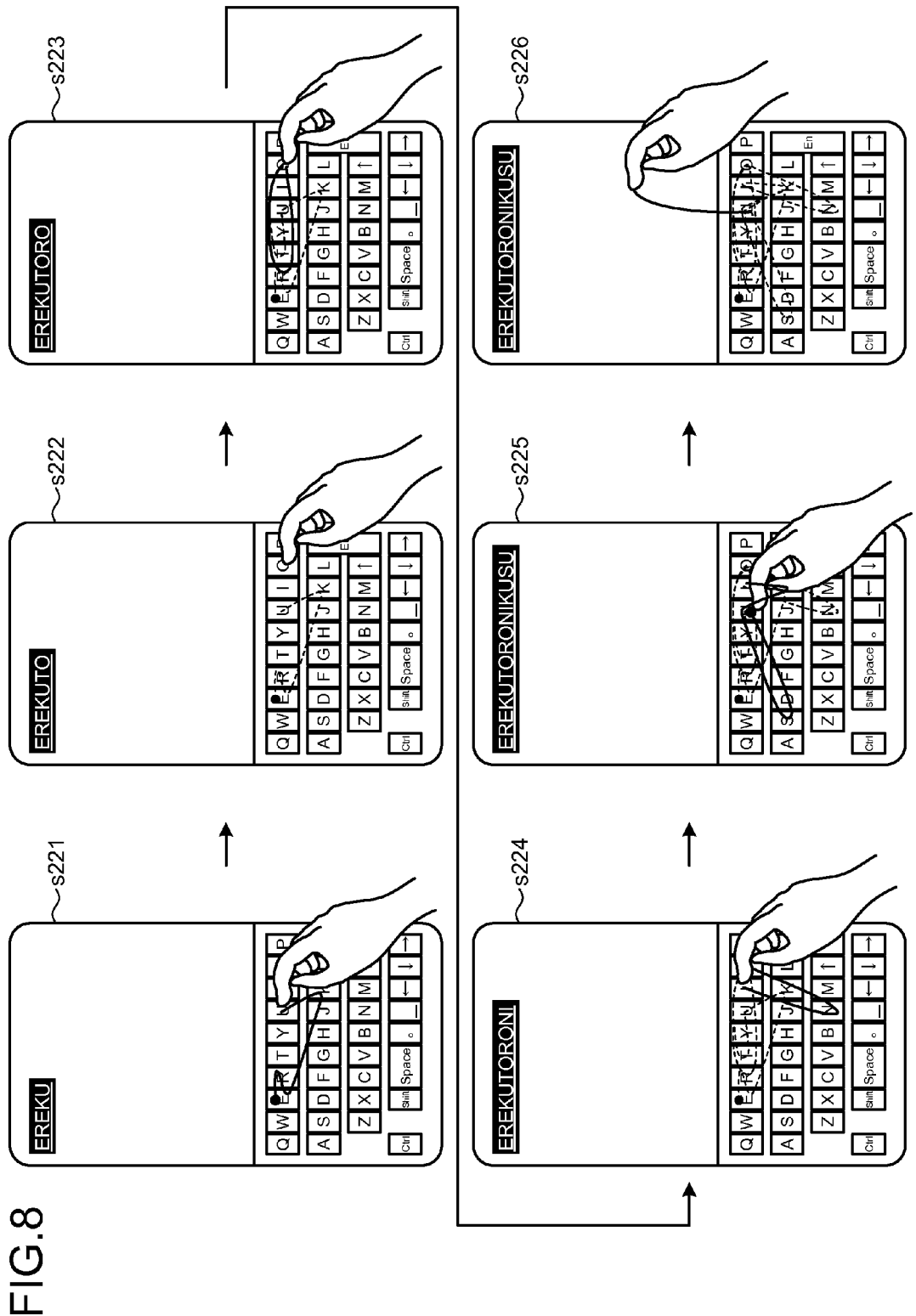
FIG. 8 is a diagram illustrating an operation example of a character input.

An operation example when the user inputs "electronics (EREKUTORONIKUSU)" to the mobile phone 1 is illustrated in FIG. 8. At s221, the finger is placed in a button area of "E", and then sequentially passes across button areas of "R", "E", "H", "J", and "K" while keeping in contact with the touch panel 2. In this case, the mobile phone 1 determines that the button "E" on which the finger is placed and the buttons "R", "E", and "K", each in which an angular difference between the entering direction and the exiting direction is greater than the threshold, are intentionally touched.

At s222, the finger sequentially passes across buttons "U", "Y", "T", "Y", "U", and "T" while keeping in contact with the touch panel 2. In this case, the mobile phone 1 determines that the buttons "U" and "T", each in which an angular difference between the entering direction and the exiting direction is greater than the threshold, are intentionally touched. At s223, the finger sequentially passes across buttons "O", "T", "U", "Y", "T", "R", "T", "Y", "U", and "I" while keeping in contact with the touch panel 2. In this case, the mobile phone 1 determines that the buttons "O" and "R", each in which an angular difference between the entering direction and the exiting direction is greater than the threshold, are intentionally touched.

At s224, the finger sequentially passes across buttons "O", "K", "N", and "J" while keeping in contact with the touch panel 2. In this case, the mobile phone 1 determines that the buttons "O" and "N", each in which an angular difference between the entering direction and the exiting direction is greater than the threshold, are intentionally touched. At s225, the finger sequentially passes across buttons "I", "K", "U", "G", "F", "D", "S", "R", "T", and "Y" while keeping in contact with the touch panel 2. In this case, the mobile phone 1 determines that the buttons "I", "K", "U", and "S", each in which an angular difference between the entering direction and the exiting direction is greater than the threshold, are intentionally touched.

At s226, the finger having moved to the button "U" while keeping in contact with the touch panel 2 is released from the touch panel 2 in a button area of "U". In this case, the mobile phone 1 determines that the button "U" located at a position where the finger is released from the touch panel 2 is intentionally touched.

With these operations, the mobile phone 1 determines that the buttons are intentionally touched in the order of "E", "R", "E", "K", "U", "T", "O", "R", "O", "N", "I", "K", "U", "S", and "U", and receives "electronics (EREKUTORONIKUSU)", in which the characters corresponding to these buttons are combined with each other in chronological order as an input character string. The character string coincides with a character string that the user intends to input.

As illustrated in FIG. 8, the mobile phone 1 determines with high accuracy whether each of the buttons, on the trajectory along which the user's finger moves while keeping in contact with the touch panel 2, is intentionally touched by the finger or the finger merely passes across the buttons based on a natural gesture of the user, and receives the inputs of the characters. Therefore, the user can input characters to the mobile phone 1 accurately and at high speed.

The mobile phone 1 is configured not to ignore the characters corresponding to the buttons determined that the finger merely passes across them but use these characters for improving input precision. Specifically, the mobile phone 1 compares a character string in which characters corresponding to the buttons (buttons to which a tap gesture is input or a button to which a specific operation is input) intentionally touched by the user are combined in chronological order with a dictionary. When a corresponding word is not found, the mobile phone 1 complements the character string with the characters corresponding to the buttons determined that the finger merely passes across them, compares again a complemented character string with the dictionary, and finds out a proper word.

For example, when the user wants to input a word "WET" to the mobile phone 1, the user places the finger in the button area of "W", then moves the finger toward the button "T" while keeping in contact with the touch panel 2, and releases the finger from the touch panel 2 in a button area of "T". An operation of touching the finger on the tap area is not input. In this case, it may be determined that the button "W" on which the finger is placed and the button "T" from which the finger is released are intentionally touched. However, each of the buttons "E" and "R" located on the trajectory along which the finger moves has a small angular difference between the entering direction and the exiting direction, and it is therefore determined that the finger merely passes across the buttons.

However, "WT", which is a character string in which the characters corresponding to the buttons determined that they are intentionally touched by the user are combined with each other in chronological order, is not present in the dictionary. Therefore, the mobile phone 1 complements the character string with the characters corresponding to the buttons determined that the finger merely passes across them in chronological order to create candidates of "WET", "WRT", and "WERT", and compares each of the candidates with the dictionary. In this case, because the word "WET" is included in the dictionary, the mobile phone 1 receives "WET" as an input character string. This character string coincides with a character string that the user intends to input.

Incidentally, when the word "WET" is to be input, the user may touch the tap area with another finger upon passage of the finger across the button "E" in the middle of moving the finger from the button "W" to the button "T" while keeping in contact with the touch panel 2. Alternatively, the user may draw a trajectory that turns in the button "E". By doing such an operation, the user explicitly instructs the mobile phone 1 that he/she intentionally touches the button "E", thereby improving identification precision of an input character string.

Figure 9:
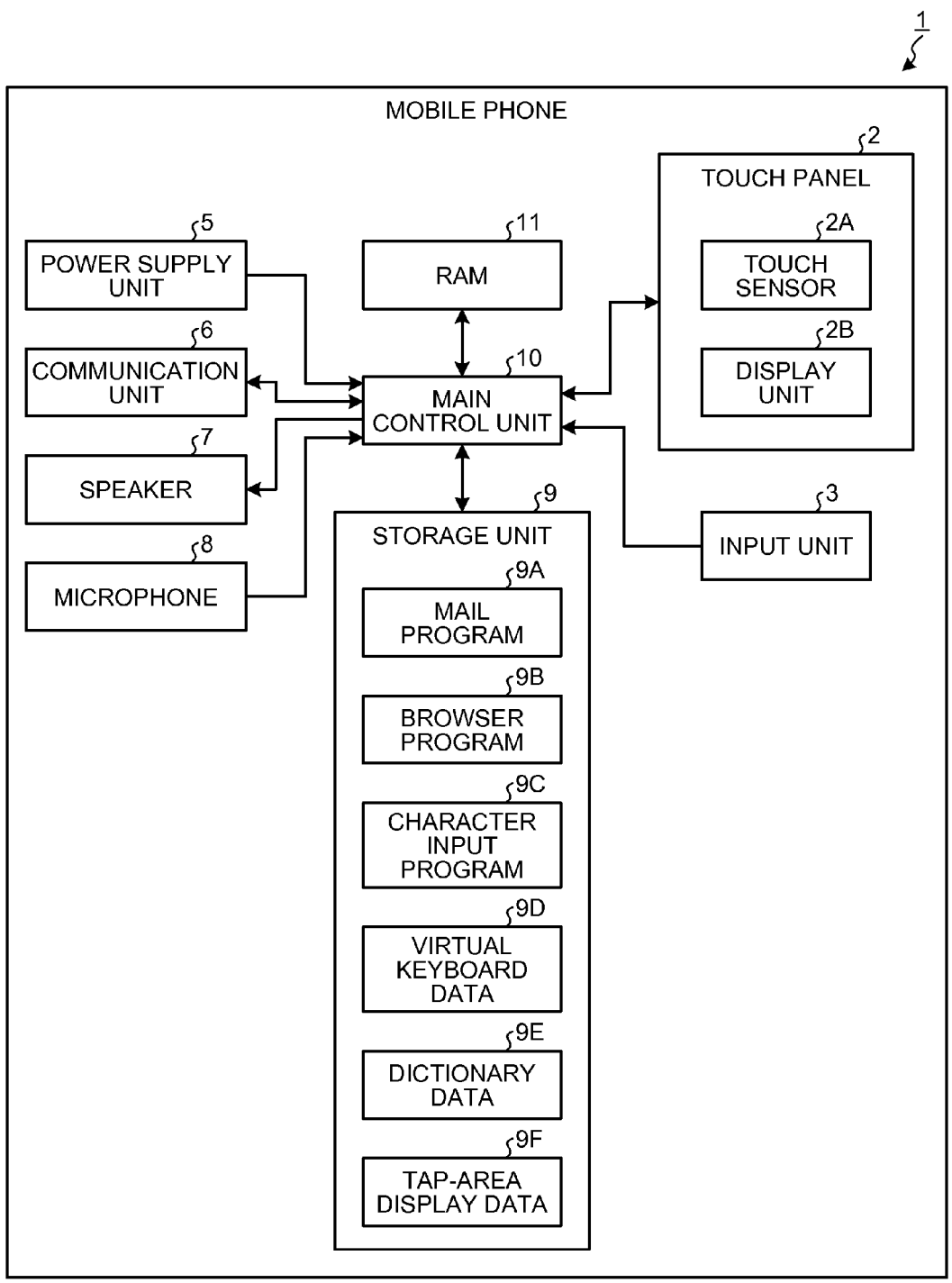
FIG. 9 is a block diagram of a schematic configuration of functions of the mobile phone.

Then a relation between the functions and the control unit of the mobile phone 1 will be explained below. FIG. 9 is a block diagram of a schematic configuration of the functions of the mobile phone 1 illustrated in FIG. 1. As illustrated in FIG. 9, the mobile phone 1 includes the touch panel 2, the input unit 3, a power supply unit 5, a communication unit 6, a speaker 7, a microphone 8, a storage unit 9, a main control unit 10, and RAM (Random Access Memory) 11.

The touch panel 2 includes a display unit 2B and a touch sensor 2A placed over the display unit 2B. The touch sensor 2A detects touches (contacts) performed on the touch panel 2 using the finger as well as positions on the touch panel 2 where the touches (contacts) are performed. The gesture detected by the touch sensor 2A includes a gesture of touching the surface of the touch panel 2 by the finger, a gesture of moving the finger while keeping in contact with the surface of the touch panel 2, and a gesture of releasing the finger from the surface of the touch panel 2. Any one of detection methods such as a pressure sensitive type detection method and a capacitive type detection method may be used as the detection method of the touch sensor 2A. The display unit 2B is formed with, for example, a liquid crystal display (LCD) or an organic electro-luminescence (OEL) panel, and displays text, graphics, images, and the like.

The input unit 3 receives a user operation through a physical button or so and transmits a signal corresponding to the received operation to the main control unit 10. The power supply unit 5 supplies electric power obtained from a battery or an external power supply to each of function units of the mobile phone 1 including the main control unit 10. The communication unit 6 establishes a wireless signal path using a CDMA system or so with a base station via a channel assigned by the base station, and performs telephone communication and information communication with the base station. The speaker 7 outputs the voice of the other party on the telephone communication, a ring tone, and the like. The microphone 8 converts the voice of the user or so to electrical signals.

The storage unit 9 is, for example, a nonvolatile memory and a magnetic storage device, and stores therein programs and data used for processes performed by the main control unit 10. Specifically, the storage unit 9 stores therein a mail program 9A for transmitting/receiving or browsing mail, a browser program 9B for browsing Web pages, a character input program 9C for receiving a character input in the continuous method, a virtual keyboard data 9D including definition for a virtual keyboard displayed on the touch panel 2 upon character input, a dictionary data 9E in which appropriate character strings are registered, and a tap-area display data 9F including data for an image to be displayed in a tap area and definition for image display. The storage unit 9 also stores therein an operating system program for performing basic functions of the mobile phone 1, and other programs and data such as address book data in which names, telephone numbers, mail addresses, and so on are registered.

The main control unit 10 is, for example, a CPU (Central Processing Unit), and integrally controls the operations of the mobile phone 1. Specifically, the main control unit 10 executes a program stored in the storage unit 9 while referring to data stored in the storage unit 9 as necessary, and executes the various processes by controlling the touch panel 2, the communication unit 6, and so on. The main control unit 10 loads the programs stored in the storage unit 9 and data, which is acquired, generated, or processed by executing the processes, to the RAM 11 providing a temporary storage area as necessary. However, the programs to be executed and the data to be referred to by the main control unit 10 may be downloaded from a server device through a wireless communication by the communication unit 6.

An example of the virtual keyboard data 9D stored in the storage unit 9 is illustrated in FIG. 10. As illustrated in the example of FIG. 10, a character corresponding to a button, a position of the button (e.g., upper left coordinates), a width, a height, and so on are registered in the virtual keyboard data 9D for each button included in the virtual keyboard 4. In the example of FIG. 10, data in which a character corresponding to a button is "Wa", upper left coordinates of the button are x=10 and y=10, a width and a height of the button are 20 and 40 respectively, and the like is registered. Registered also in the virtual keyboard data 9D are, in addition to the data for the virtual keyboard 4, data for the virtual keyboard 4a and the additional virtual keyboards 42 and 44. Registered in the tap-area display data 9F are images corresponding to buttons of the keyboard such as "A", "I", and "U" as images to be displayed in the tap area. Registered also in the tap-area display data 9F are data for definition of display positions where images are displayed.

Figure 11:
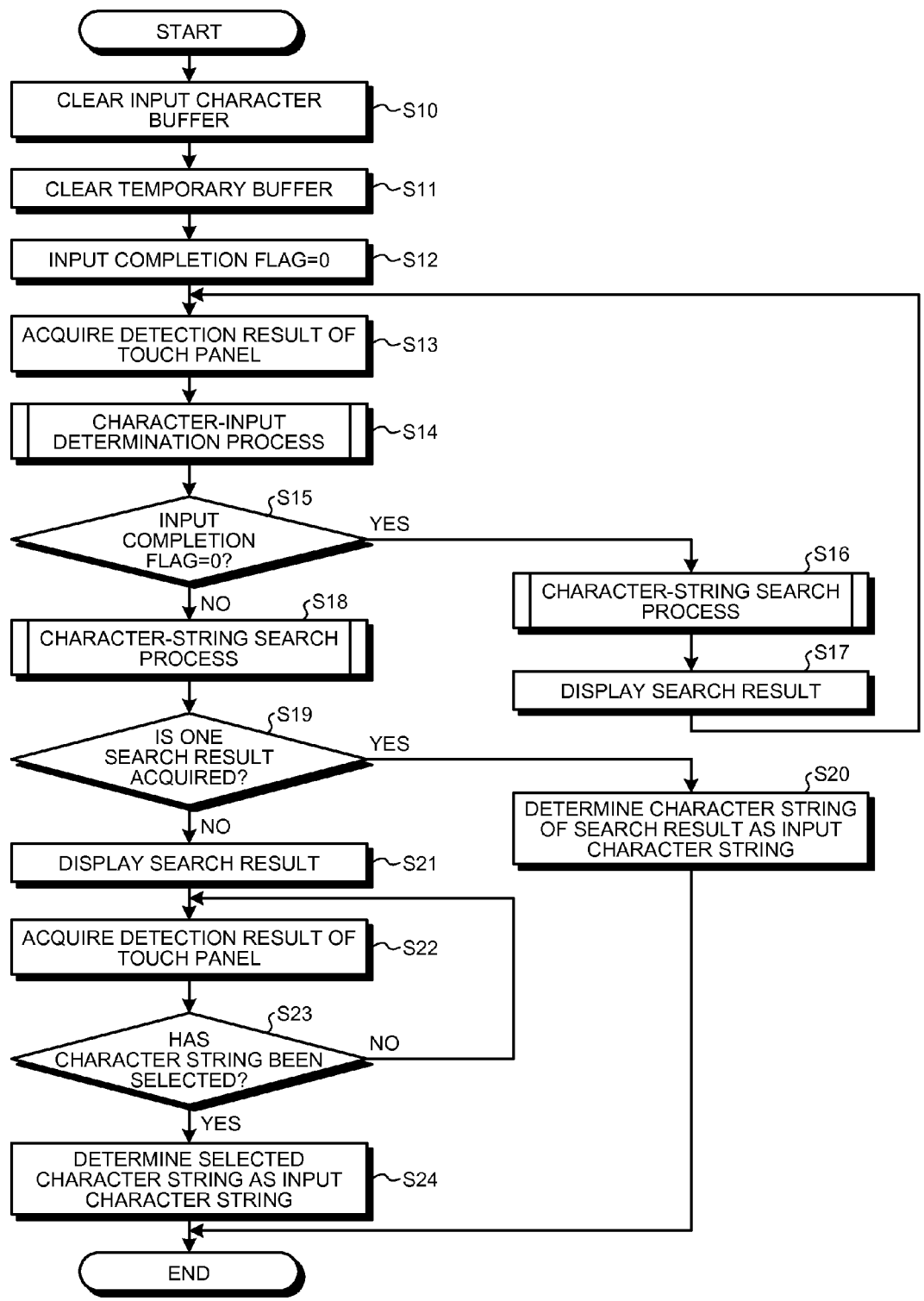
FIG. 11 is a flowchart illustrating a procedure of a character input process performed by the mobile phone.

Then an operation when the mobile phone 1 receives a character input will be explained below. FIG. 11 is a flowchart illustrating a procedure of a character input process performed by the mobile phone 1. The character input process in FIG. 11 is implemented by the main control unit 10 reading the character input program 9C from the storage unit 9 and executing it. The character input process in FIG. 11 is repeatedly executed during display of the virtual keyboard 4 on the touch panel 2. The virtual keyboard 4 is displayed on the touch panel 2 by the main control unit 10 executing the character input program 9C or other program.

First of all, the main control unit 10 clears an input character buffer 12 at Step S10, and clears a temporary buffer 13 at Step S11. The input character buffer 12 is a storage area in which characters corresponding to buttons on the trajectory along which the finger moves while keeping in contact with the touch panel 2 are stored in association with priorities, and which is provided in the RAM 11. The temporary buffer 13 is a storage area in which a character corresponding to a button determined that the finger merely passes across the button, among the buttons on the trajectory along which the finger moves while keeping in contact with the touch panel 2 is temporarily stored, and which is provided in the RAM 11.

Figure 12:
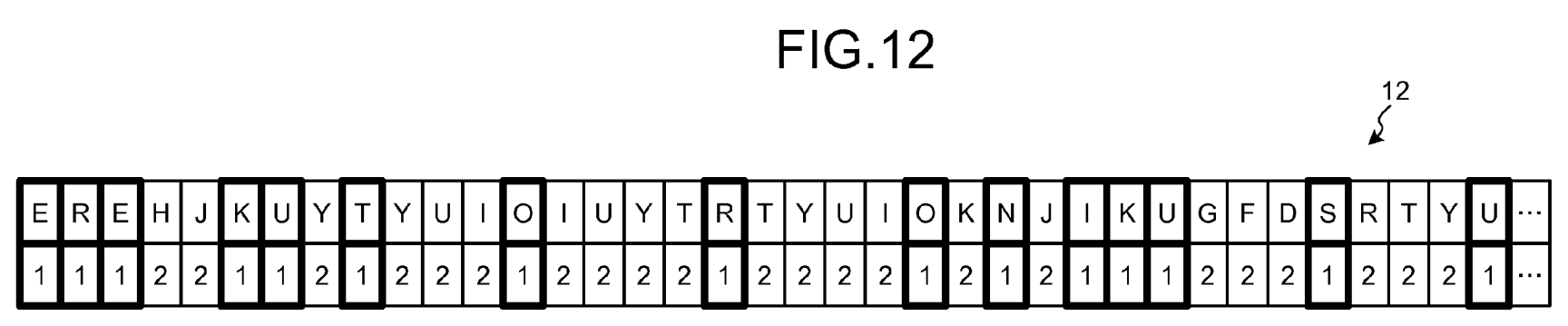

An example of the input character buffer 12 is illustrated in FIG. 12. FIG. 12 depicts the input character buffer 12 when the operations illustrated in FIG. 8 are performed on the touch panel 2. In the example of FIG. 12, the characters corresponding to the buttons on the trajectory along which the finger moves while keeping in contact with the touch panel 2 are stored in an upper case of the input character buffer 12, and the priorities associated with the respective characters in the upper case are stored in a lower case thereof. As illustrated in FIG. 12, the characters corresponding to the buttons on the trajectory along which the finger moves while keeping in contact with the touch panel 2 are stored in the input character buffer 12 in chronological order. FIG. 12 is information for characters stored in the mobile phone 1 when electronics (EREKUTORONIKUSU) is to be input.

Priorities are used to determine whether an associated character is used when the characters included in the input character buffer 12 are combined to form a character string. In the present embodiment, if the value of the priority is smaller, then a character associated to the priority is more preferentially adopted. Specifically, "1" as the priority is associated with a character corresponding to a button determined that it is intentionally touched by the finger, and "2" as the priority is associated with a character corresponding to a button determined that the finger merely passes across it.

Figure 13:
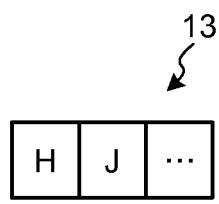
FIG. 13 is a diagram illustrating an example of a temporary buffer.

An example of the temporary buffer 13 is illustrated in FIG. 13. FIG. 13 depicts the temporary buffer 13 at a time when the finger exits the button "J" at s221 in FIG. 8. As illustrated in FIG. 13, characters corresponding to the buttons determined that the finger merely passes across them are stored in chronological order until it is determined that any of the buttons is intentionally touched by the finger.

When clearing of the input character buffer 12 and the temporary buffer 13 is completed, then at Step S12, the main control unit 10 sets an input completion flag provided in the RAM 11 to 0. The input completion flag is used to determine whether a character input at a time is completed. The character input at a time mentioned here means a character input performed from when the user brings the finger into contact with the touch panel 2 to when the user releases the finger therefrom.

Subsequently, the main control unit 10 acquires the latest detection result of the touch panel 2 at Step S13, and performs the character-input determination process at Step S14. In the character-input determination process, the main control unit 10 stores characters corresponding to buttons displayed on the trajectory along which the finger moves while keeping in contact with the touch panel 2 in the input character buffer 12 and the temporary buffer 13. Details of the character-input determination process will be explained later.

After the execution of the character-input determination process, the main control unit 10 determines whether the input completion flag remains to be 0 at Step S15. When the input completion flag remains to be 0, that is, when the character input at a time is not completed yet (Yes at Step S15), then at Step S16, the main control unit 10 performs a character-string search process and searches for a character string that matches the character string obtained by combining the characters stored in the input character buffer 12 from the dictionary data 9E. Details of the character-string search process will be explained later.

Figure 14:
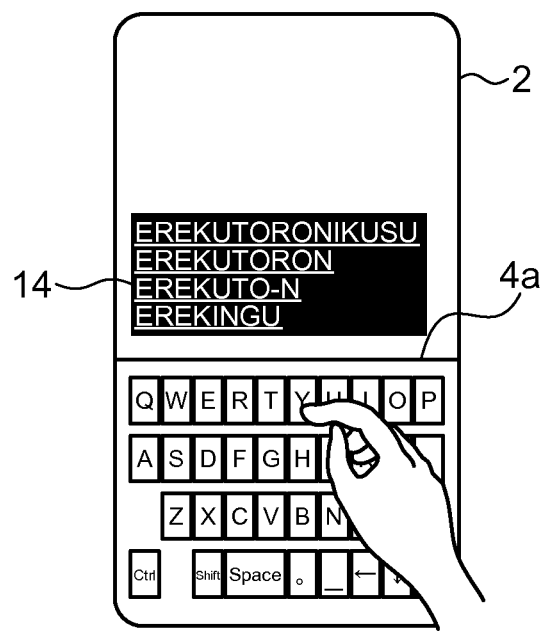
FIG. 14 is a diagram illustrating an input-character-string candidate display area displayed on the touch panel.

Subsequently, at Step S17, the main control unit 10 displays one or more character strings acquired through the character-string search process in an input-character-string candidate display area 14 as illustrated in FIG. 14. The main control unit 10 then repeatedly executes Step S13 to Step S17 until it is determined that the input completion flag is not 0, that is, it is determined that the character input at a time is completed at Step S15.

When the input completion flag is not 0 at Step S15 (No at Step S15), then at Step S18, the main control unit 10 executes the character-string search process and searches for a character string that matches the character string obtained by combining the characters stored in the input character buffer 12 from the dictionary data 9E. After the search process is performed at Step S18, at Step S19, the main control unit 10 determines whether only one character string is acquired as the process result (i.e. search result) of the character-string search process. When only one character string is acquired as the process result (i.e. search result) of the character-string search process (Yes at Step S19), then at Step S20, the main control unit 10 receives the character string acquired as the process result (i.e. search result) of the character-string search process as an input character string.

Meanwhile, when a plurality of character strings are acquired as the process results of the character-string search process (No at Step S19), then at Step S21, the main control unit 10 displays the character strings acquired as the process results of the character-string search process in the input-character-string candidate display area 14 as illustrated in FIG. 14. The main control unit 10 then acquires the latest detection result of the touch panel 2 at Step S22, and determines whether any of the character strings displayed in the input-character-string candidate display area 14 has been selected at Step S23.

When none of the character strings has been selected (No at Step S23), the main control unit 10 repeatedly executes Step S22 to Step S23 until any of the character strings is selected. When a gesture indicating cancel of input, such as touching an area other than the input-character-string candidate display area 14 with the user's finger, is detected at Step S22, the main control unit 10 may terminate the character input process.

When any of the character strings displayed in the input-character-string candidate display area 14 has been selected at Step S23 (Yes at Step S23), then at Step S24, the main control unit 10 receives the selected character string as an input character string.

Figure 15:
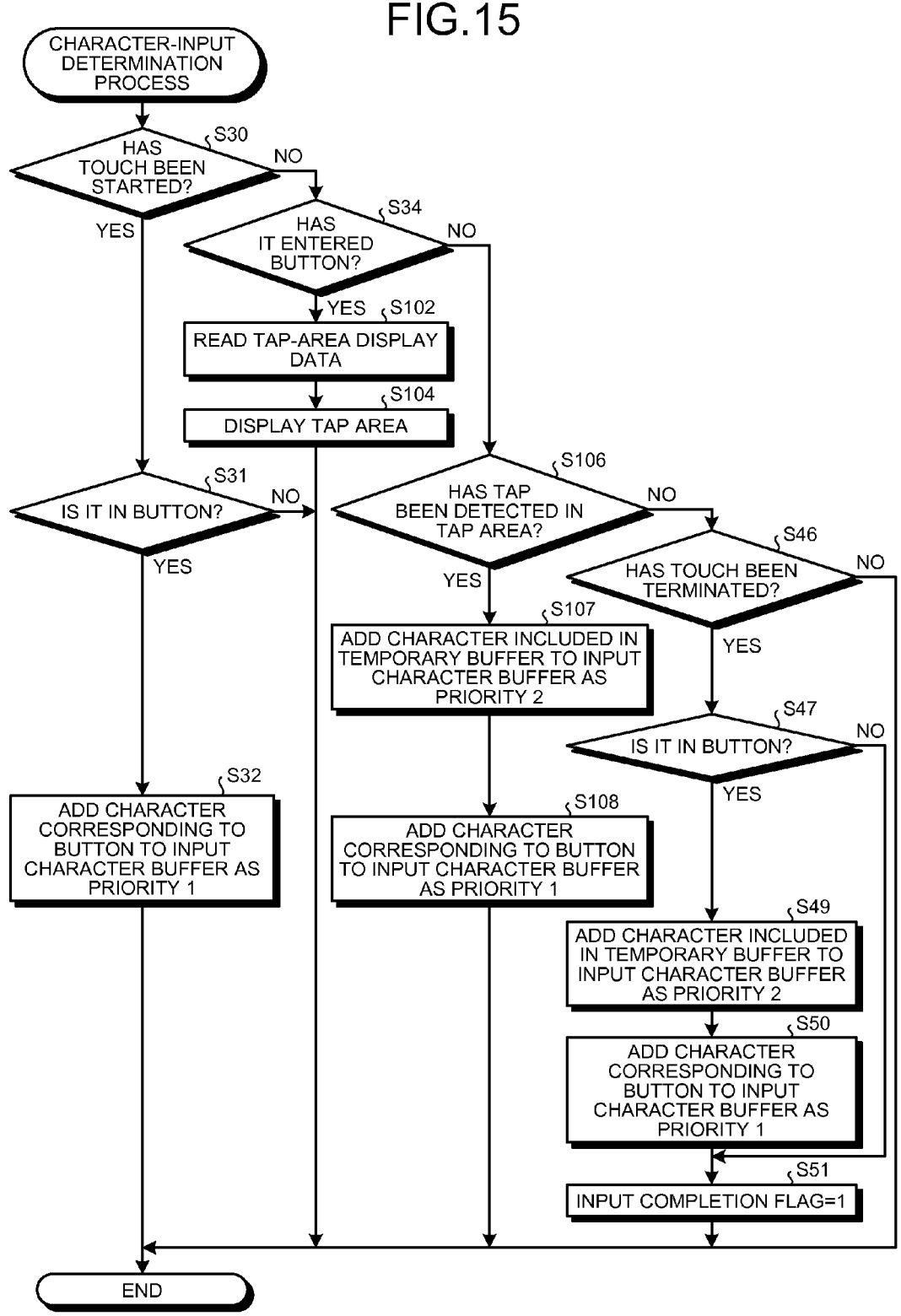
FIG. 15 is a flowchart illustrating a procedure of a character-input determination process.

Then the character-input determination process executed at Step S14 in FIG. 11 will be explained with reference to a flowchart illustrated in FIG. 15. At Step S30, the main control unit 10 determines whether the gesture detected through the touch panel 2 is a gesture of starting a touch on the touch panel 2, that is, a gesture of bringing the finger into contact with the surface of the touch panel 2 based on the detection result of the touch panel 2.

When the detected gesture is a gesture of starting a touch on the touch panel 2 (Yes at Step S30), then at Step S31, the main control unit 10 compares the position where the touch is started with the virtual keyboard data 9D, and determines whether the position where the touch is started is in any of the button areas. When the position where the touch is started is in any of the button areas (Yes at Step S31), the button is assumed to be intentionally touched, and, therefore, at Step S32, the main control unit 10 adds the character corresponding to the button to the input character buffer 12 in association with the priority "1". The character corresponding to the button is acquired from the virtual keyboard data 9D. The main control unit 10 adds the character associated with the priority "1" to the input character buffer 12, and ends the character-input determination process.

At Step S31, when the position where the touch is started is not in the button area (No at Step S31), the main control unit 10 ends the character-input determination process without performing any particular process.

At Step S30, when the gesture detected through the touch panel 2 is not a gesture of starting a touch on the touch panel 2 (No at Step S30), then Step S34, the main control unit 10 determines whether the gesture detected through the touch panel 2 is a gesture of moving the finger into the button area while keeping in contact with the touch panel 2 based on the detection result of the touch panel 2. Whether the detected gesture is a gesture of moving the finger into the button area while keeping in contact with the touch panel 2 is determined by comparing the touch position indicated by the latest detection result and the touch position indicated by the previous detection result with the virtual keyboard data 9D.

When the detected gesture is the gesture of moving the finger into the button area while keeping in contact with the touch panel 2 (Yes at Step S34), then at Step S102, the main control unit 10 reads the tap-area display data 9F. Specifically, the main control unit 10 reads the data for an image corresponding to the button touched by the finger and the data for definition to display the image from the tap-area display data 9F. Then at Step S104, the main control unit 10 displays a tap area. That is, the main control unit 10 displays the image in an area as the tap area based on the data read at Step S102. At this time, the main control unit 10 displays, for example, a character on the button touched by the finger (button which the trajectory enters) as an image in the tap area. The image may be displayed in part of the tap area or may be displayed over the whole area of the tap area. The tap area can be an area superimposed on an image of the keyboard. After the display of the tap area, the main control unit 10 ends the character-input determination process.

At Step S34, when the gesture detected through the touch panel 2 is not the gesture of moving the finger into the button area while keeping in contact with the touch panel 2 (No at Step S34), then at Step S106, the main control unit 10 determines whether a tap on the tap area is input based on the detection result of the touch panel 2. That is, the main control unit 10 determines whether a touch on the tap area displayed at Step S104 has been detected through the touch panel 2.

When the tap on the tap area has been detected (Yes at Step S106), then at Step S107, the main control unit 10 adds the character stored in the temporary buffer 13 to the input character buffer 12 in association with priority "2". Subsequently, at Step S108, the main control unit 10 adds the character corresponding to the button to the input character buffer 12 in association with priority "1". After the addition of the association to the input character buffer 12, the main control unit 10 ends the character-input determination process.

At Step S106, when the gesture of tapping the tap area has not been detected through the touch panel 2 (No at Step S106), then at Step S46, the main control unit 10 determines whether the gesture detected through the touch panel 2 is a gesture of terminating the touch on the touch panel 2, that is, a gesture of releasing the finger from the touch panel 2 based on the detection result of the touch panel 2.

When the gesture detected is the gesture of terminating the touch on the touch panel 2 (Yes at Step S46), then at Step S47, the main control unit 10 compares the position where the touch is terminated with the virtual keyboard data 9D, and determines whether the position where the touch is terminated is in any of button areas. When the position where the touch is terminated is in any of the button areas (Yes at Step S47), it is considered that the button is intentionally touched. Therefore, the main control unit 10 executes the procedure of Step 49 and the subsequent steps so that the character corresponding to the button is stored in the input character buffer 12 together with characters corresponding to other buttons on the trajectory along which the finger passes in chronological order.

At Step S49, the main control unit 10 adds the character stored in the temporary buffer 13 to the input character buffer 12 in association with priority "2". The temporary buffer 13 stores therein buttons, of the buttons arranged on the trajectory along which the finger passes, which are not set to priority "1" at Step S32 and Step S108. In other words, the button which is neither the button tapped during passage of the finger nor the button touched upon start of the touch is stored therein. Then at Step S50, the main control unit 10 adds the character corresponding to the button to the input character buffer 12 in association with priority "1".

The fact that the gesture of terminating the touch on the touch panel 2 is performed indicates that the character input at a time is completed. Therefore, the main control unit 10 sets the input completion flag to "1" at Step S51, and ends the character-input determination process.

When the position where the touch is terminated is not in the button area (No at Step S47), then at Step S51, the main control unit 10 performs only the process of setting the input completion flag to "1", and ends the character-input determination process.

When the position where the touch is terminated is not in a button area, the character stored in the temporary buffer 13 may be added to the input character buffer 12 in association with priority "2".

At Step S46, when the gesture detected through the touch panel 2 is not the gesture of terminating the touch on the touch panel 2 (No at Step S46), the main control unit 10 ends the character-input determination process.

In this way, by setting the character where the tap is detected to priority "1" to be added to the input character buffer 12, the mobile phone 1 can appropriately detect a character to which the user inputs an intentional operation.

The mobile phone 1 may detect, in addition to detection of a tap (second touch gesture), a gesture of starting a touch at a first position on the surface of the touch panel 2 and terminating the touch at a second position on the surface of the touch panel 2, that is, a specific operation input by "first touch gesture" in which the touch position is continuously changed. In other words, the mobile phone 1 may detect a specific operation from the trajectory input by the finger.

Figure 16A:
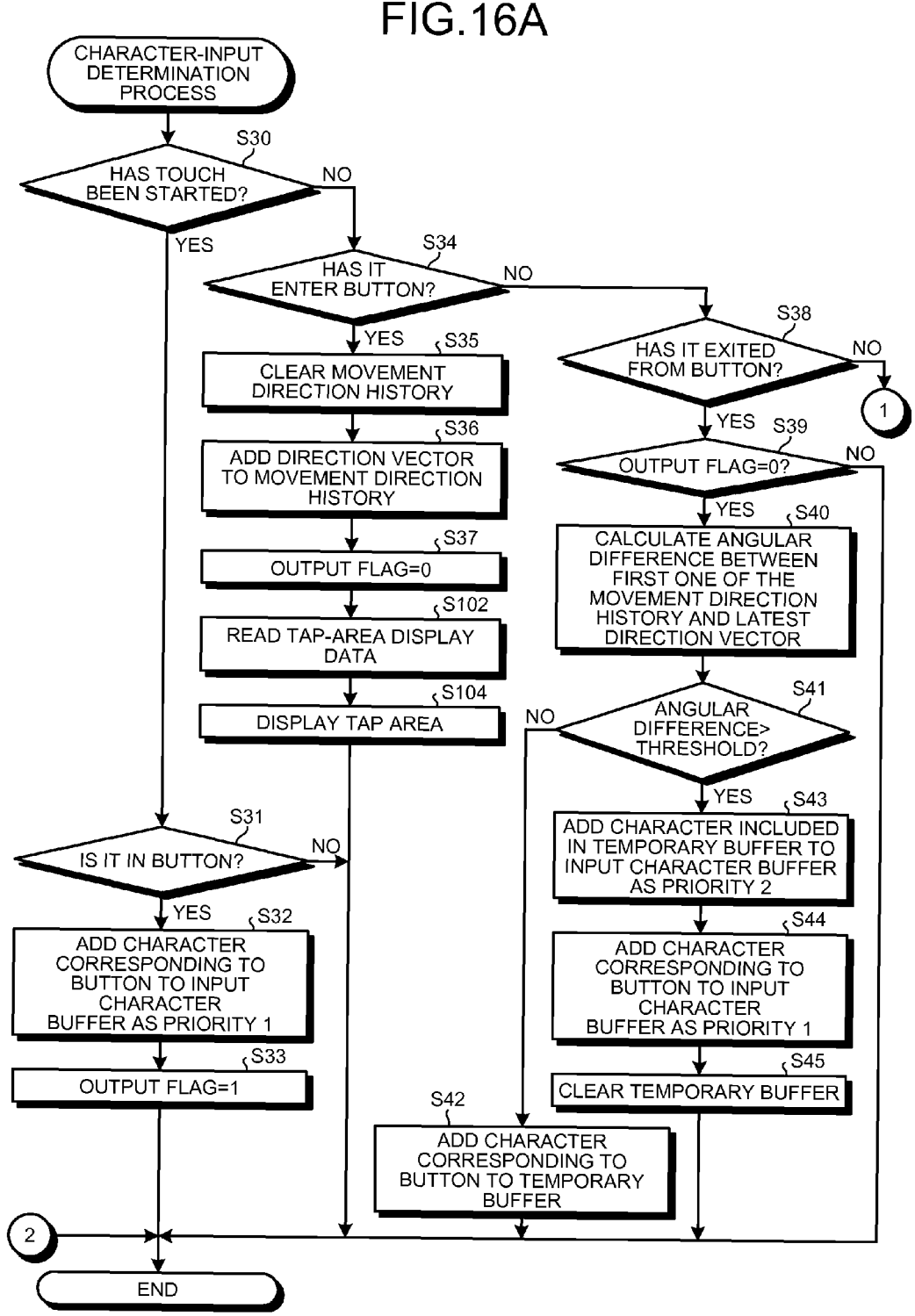
FIG. 16A is a flowchart illustrating another example of the procedure of the character-input determination process.
Figure 16B:
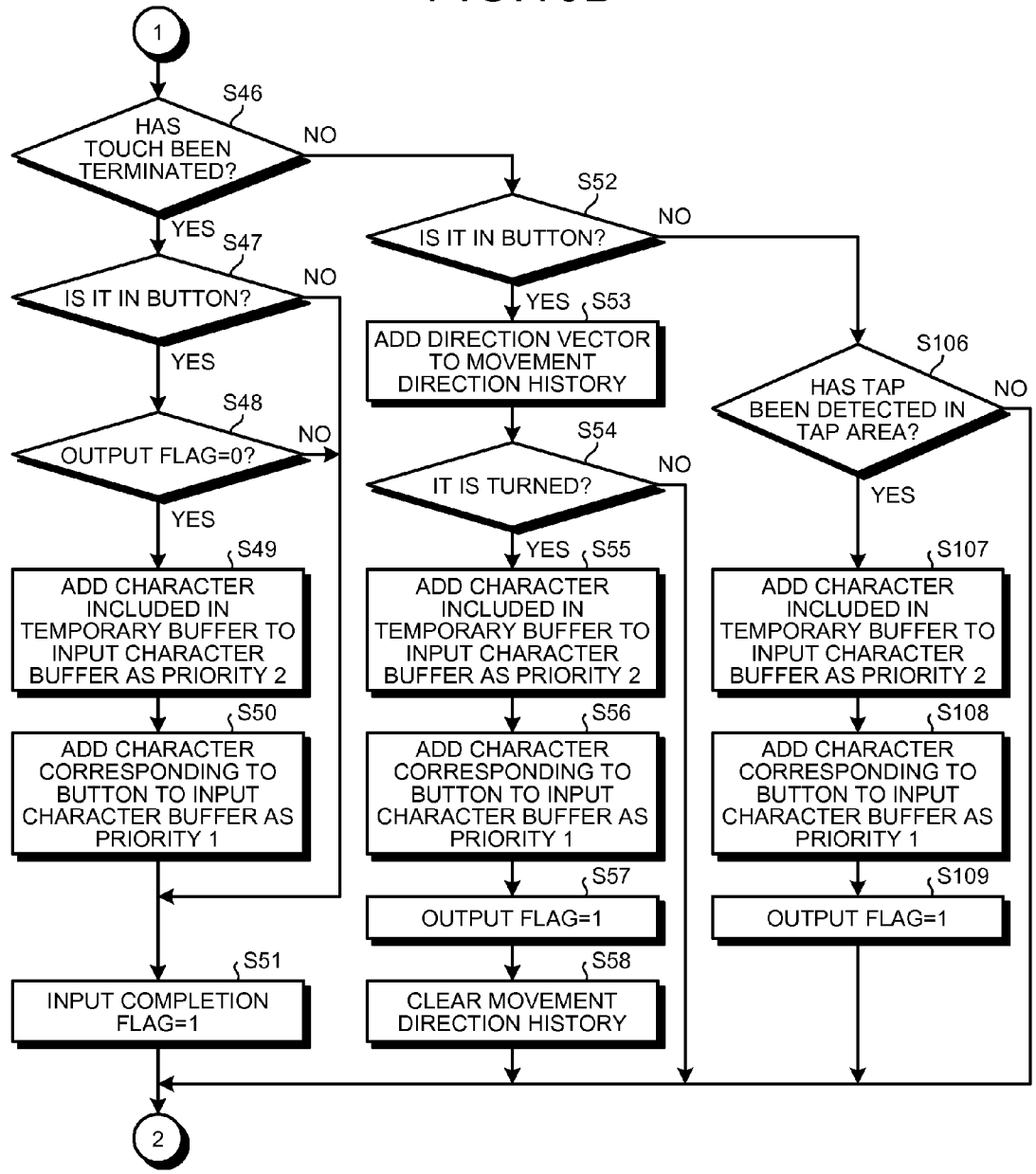
FIG. 16B is a flowchart illustrating another example of the procedure of the character-input determination process.

Another example of the character-input determination process executed at Step S14 in FIG. 11 will be explained below with reference to flowcharts illustrated in FIG. 16A and FIG. 16B. FIG. 16A and FIG. 16B are flowcharts illustrating another example of the procedure of the character-input determination process. Part of processes, of processes in the flowcharts illustrated in FIG. 16A and FIG. 16B, is the same as the processes of the flowchart in FIG. 15. Therefore, the same processes are assigned with the same step numbers and detailed explanation thereof is omitted. At Step S30, the main control unit 10 determines whether the gesture detected through the touch panel 2 is a gesture of starting a touch on the touch panel 2 based on the detection result of the touch panel 2.

When the detected gesture is the gesture of starting a touch on the touch panel 2 (Yes at Step S30), then at Step S31, the main control unit 10 determines whether the position where the touch is started is in any of buttons (i.e. in a button area). When the position where the touch is started is in any of the button areas (Yes at Step S31), then at Step S32, the main control unit 10 adds a character corresponding to the button to the input character buffer 12 in association with priority "1".

Then, at Step S33, the main control unit 10 sets an output flag to "1", and ends the character-input determination process. The output flag is provided in the RAM 11 and is used to determine whether the character corresponding to the button displayed at the position currently touched by the finger has already been output to the input character buffer 12 or to the temporary buffer 13. If the value of the output flag is "0", this indicates that the character corresponding to the button displayed at the position currently touched by the finger is output to neither of the buffers. If the value of the output flag is "1", this indicates that the character corresponding to the button displayed at the position currently touched by the finger has already been output to either of the buffers.

At Step S31, when the position where the touch is started is not in a button area (No at Step S31), the main control unit 10 ends the character-input determination process without performing any particular process.

At Step S30, when the gesture detected through the touch panel 2 is not the gesture of starting a touch on the touch panel 2 (No at Step S30), then at Step S34, the main control unit 10 determines whether the gesture detected through the touch panel 2 is a gesture of moving the finger into a button (i.e. button area) while keeping in contact with the touch panel 2 based on the detection result of the touch panel 2.

When the gesture detected is the gesture of moving the finger into the button area while keeping in contact with the touch panel 2 (Yes at Step S34), then at Step S35, the main control unit 10 clears a movement direction history. The movement direction history is data in which a direction vector indicating which direction the finger moves in a button area is recorded in chronological order, and is stored in the RAM 11.

Subsequently, at Step S36, the main control unit 10 acquires a direction vector indicating the direction in which the finger enters the button area, and adds the acquired direction vector to the movement direction history.

If the information indicating the movement direction of the finger is included in the detection result of the touch panel 2, the direction vector is acquired from the detection result of the touch panel 2. If the information indicating the movement direction of the finger is not included in the detection result of the touch panel 2, the direction vector is calculated from the touch position indicated by the latest detection result of the touch panel 2 and from the touch position indicated by the previous detection result.

After the addition of the direction vector to the movement direction history, at Step S37, the main control unit 10 sets the output flag to "0". Furthermore, at Step S102, the main control unit 10 reads the tap-area display data 9F. Then at Step S104, the main control unit 10 displays a tap area and ends the character-input determination process.

At Step S34, when the gesture detected through the touch panel 2 is not the gesture of moving the finger into the button area while keeping in contact with the touch panel 2 (No at Step S34), then at Step S38, the main control unit 10 determines whether the gesture detected through the touch panel 2 is a gesture of moving the finger out of a button while keeping in contact with the touch panel 2 based on the detection result of the touch panel 2. Whether the gesture detected is the gesture of moving the finger out of the button while keeping in contact with the touch panel 2 is determined by comparing the touch position indicated by the latest detection result of the touch panel 2 and the touch position indicated by the previous detection result with the virtual keyboard data 9D.

When the gesture detected is the gesture of moving the finger out of the button while keeping in contact with the touch panel 2 (Yes at Step S38), then at Step S39, the main control unit 10 determines whether the output flag is "0". When the output flag is not "0", that is, when the character corresponding to the button in which the finger has been placed so far is already output to either of the buffers (No at Step S39), the main control unit 10 ends the character-input determination process without performing any particular process.

Meanwhile, when the output flag is "0" (Yes at Step S39), then at Step S40, the main control unit 10 acquires the latest movement vector, that is, a direction vector indicating the direction in which the finger moves out of the button, and calculates the angular difference between a first direction vector of the movement direction history and the acquired direction vector. The angular difference calculated at this time represents the magnitude of difference between the direction in which the finger enters the button and the direction in which the finger exits the button.

When the calculated angular difference is a predetermined is not larger than threshold (No at Step S41), it is considered that the finger only passes across the button. Therefore, at Step S42, the main control unit 10 adds the character corresponding to the button to the temporary buffer 13, and ends the character-input determination process.

Meanwhile, when the calculated angular difference is larger than the predetermined threshold (Yes at Step S41), it is considered that the button is intentionally touched. Therefore, the main control unit 10 executes a procedure of Step S43 and the subsequent steps so that the character corresponding to the button is stored in the input character buffer 12 together with characters corresponding to other buttons on the trajectory that the finger passes in chronological order.

At Step S43, the main control unit 10 adds the characters stored in the temporary buffer 13 to the input character buffer 12 in association with priority "2". Subsequently, at Step S44, the main control unit 10 adds the character corresponding to the button to the input character buffer 12 in association with priority "1". Then at Step S45, the main control unit 10 clears the temporary buffer 13 and ends the character-input determination process.

At Step S38, when the gesture detected through the touch panel 2 is not the gesture of moving the finger out of the button while keeping in contact with the touch panel 2 (No at Step S38), then at Step S46, the main control unit 10 determines whether the gesture detected through the touch panel 2 is a gesture of terminating the touch on the touch panel 2, that is, a gesture of releasing the finger from the touch panel 2 based on the detection result of the touch panel 2.

When the detected gesture is the gesture of terminating the touch on the touch panel 2 (Yes at Step S46), then at Step S47, the main control unit 10 compares the position where the touch is terminated with the virtual keyboard data 9D, and determines whether the position where the touch is terminated is in any of the button areas. When the position where the touch is terminated is in any of the button areas (Yes at Step S47), then at Step S48, the main control unit 10 determines whether the output flag is "0". When the output flag is "0", that is, when the character corresponding to the button assumed to be intentionally touched is not output to any of the buffers (Yes at Step S48), then at Step S49, the main control unit 10 adds the characters included (i.e. stored) in the temporary buffer 13 to the input character buffer 12 in association with priority "2". Then at Step S50, the main control unit 10 adds the character corresponding to the button to the input character buffer 12 in association with priority "1". At Step S51, the main control unit 10 then sets the input completion flag to "1" and ends the character-input determination process.

When the position where the touch is terminated is not in a button area (No at Step S47) or when the output flag is not "0" (No at Step S48), then at Step S51, the main control unit 10 performs only the process of setting the input completion flag to "1" and ends the character-input determination process.

However, when the position where the touch is terminated is not in a button area or when the output flag is not "0", the main control unit 10 may add the character stored in the temporary buffer 13 to the input character buffer 12 in association with priority "2".

At Step S46, when the gesture detected through the touch panel 2 is not the gesture of terminating the touch on the touch panel 2 (No at Step S46), then at Step S52, the main control unit 10 determines whether the gesture detected through the touch panel 2 is a gesture of moving the finger in the button area while keeping in contact with the touch panel 2 based on the detection result of the touch panel 2.

When the detected gesture is the gesture of moving the finger in the button area while keeping in contact with the touch panel 2 (Yes at Step S52), then at Step S53, the main control unit 10 acquires a direction vector indicating the direction in which the finger moves in the button area, and adds the acquired direction vector to the movement direction history. At Step S54, the main control unit 10 refers to each direction vector recorded in the movement direction history, and determines whether the finger moves while drawing a trajectory that turns in the button area while keeping in contact with the touch panel 2. When the finger moves without drawing a trajectory that turns in the button area while keeping in contact with the touch panel 2 (No at Step S54), it is considered that the button is not intentionally touched. Therefore, the main control unit 10 ends the character-input determination process without performing any particular process.

When the finger moves while drawing a trajectory that turns in the button area while keeping in contact with the touch panel 2 (Yes at Step S54), it is considered that the button is intentionally touched. Therefore, the main control unit 10 executes the procedure of Step S55 and the subsequent steps so that the character corresponding to the button is stored in the input character buffer 12 together with characters corresponding to other buttons on the trajectory that the finger passes in chronological order.

At Step S55, the main control unit 10 adds the characters stored in the temporary buffer 13 to the input character buffer 12 in association with priority "2". Subsequently, at Step S56, the main control unit 10 adds the character corresponding to the button to the input character buffer 12 in association with priority "1". The main control unit 10 then sets the output flag to "1" at Step S57, clears the movement direction history at Step S58, and terminates the character-input determination process.

At Step S52, when the gesture detected through the touch panel 2 is not the gesture of moving the finger in the button area while keeping in contact with the touch panel 2, that is, when the finger moves outside the button on the virtual keyboard 4 (No at Step S52), then at Step S106, the main control unit 10 determines whether a tap on the tap area has been input based on the detection result of the touch panel 2.

When the tap on the tap area has been detected (Yes at Step S106), then at Step S107, the main control unit 10 adds the characters included (i.e. stored) in the temporary buffer 13 to the input character buffer 12 in association with priority "2". Subsequently, at Step S108, the main control unit 10 adds the character corresponding to the button to the input character buffer 12 in association with priority "1". At Step S109, the main control unit 10 then sets the output flag to "1" and ends the character-input determination process.

At Step S106, the gesture of tapping the tap area has not been detected through the touch panel 2 (No at Step S106), the main control unit 10 ends the character-input determination process without performing any particular process.

When the gesture of moving the finger out of the virtual keyboard 4 while keeping in contact with the touch panel 2 is detected, the main control unit 10 may execute the same procedure as that when the gesture of terminating the touch on the touch panel 2 is detected. When the gesture of moving the finger into the virtual keyboard 4 while keeping in contact with the touch panel 2 is detected, the main control unit 10 may execute the same procedure as that when the gesture of starting the touch on the touch panel 2 is detected. By doing in this manner, the user can quickly move to the next input with the finger kept in contact with the touch panel 2 without moving up or down the finger after the end of an input at a time.

Then the character-string search process executed at Step S16 to Step S18 in FIG. 11 will be explained below with reference to the flowchart illustrated in FIG. 17. At Step S70, the main control unit 10 acquires the characters with the priority of "1" from the input character buffer 12 and generates a first-candidate character string by combining acquired characters.

For example, it is assumed that four characters of "A", "B", "C", and "D" are stored in the input character buffer 12 in this order, and that the priority of "A" and "D" is "1" while the priority of "B" and "C" is "2". In this case, the main control unit 10 combines the characters with the priority of "1" in the order of their storage to generate the first-candidate character string such as "AB".

Subsequently, at Step S71, the main control unit 10 searches for a character string matching the first-candidate character string from the dictionary data 9E.

In the present embodiment, when the first-candidate character string is, for example, "ABC", a character string matching a pattern of "A*B*C*" is assumed to be searched from the dictionary data 9E. Here, "*" is a wild card that matches an arbitrary character. That is, in the present embodiment, a character string, of which a first character matches the first-candidate character string and of which characters same as the second character and the subsequent characters in the first-candidate character string appear in the same order as the first-candidate character string through zero or more characters, is searched as the character string that matches the first-candidate character string.

By thus matching, the probability of correctly identifying the input character string can be increased even if there is any button that cannot be determined that it is intentionally touched by the finger.

When a plurality of character strings are obtained as the search result (Yes at Step S72), then at Step S73, to narrow down the search result, the main control unit 10 acquires a character with the priority of "2" from the input character buffer 12, complements the first-candidate character string with the acquired character, and generates one or more second-candidate character strings.

For example, similarly to the above explanation, it is assumed that a character string with four characters of "A", "B", "C", and "D" is stored in the input character buffer 12 in this order, and that the priority of "A" and "D" is "1" while the priority of "B" and "C" is "2". In this case, the main control unit 10 complements "AB" being the first-candidate character string with at least one character with the priority of "2", to generate three second-candidate character strings: "ABD", "ACD", and "ABCD".

Subsequently, at Step S74, the main control unit 10 searches for a character string matching any of the second-candidate character strings from the dictionary data 9E. The method of matching is the same as the case of the first-candidate character string.

At Step S75, when any of the character strings has been searched (Yes at Step S75), then at Step S76, the main control unit 10 determines that the searched character string is a search result and ends the character-string search process. Meanwhile, at Step S75, when no character string has been searched (No at Step S75), then at Step S77, the main control unit 10 determines that the character string searched by using the first-candidate character string at Step S71, that is, the character string matching the first-candidate character string is a search result and ends the character-string search process.

When only one character string is obtained as the search result at Step S72 (No at Step S72 and Yes at Step S78), then at Step S76, the main control unit 10 determines that the searched character string is a search result and ends the character-string search process. When even one character string is not obtained as the search result at Step S72 (No at Step S78), then at Step S79, the main control unit 10 determines that the first-candidate character string, that is, a character string obtained by combining characters with the priority of "1" in the order of storing them is a search result and ends the character-string search process.

As explained above, the mobile phone 1 allows character input by moving the finger across the virtual keyboard 4 without lifting it from the touch panel 2, thus achieving fast character input.

The configuration of the mobile phone 1 can be arbitrarily modified within a scope that does not depart from the gist of the present invention. In the present embodiment, "1" or "2" as priority is associated with characters corresponding to the buttons on a trajectory along which the finger moves without lifting it from the touch panel 2; however, the priority to be associated with each character may be further subdivided. The priority is stored, for example, as weighting information. When it is stored as the weighting information, weighting information of a high value is associated with a character with high priority, and weighting information of a low value is associated with a character with low priority.

For example, "1" as priority may be associated with a character corresponding to the button determined that it is intentionally touched, and any one of values of "2" to "5" as priority may be associated with a character corresponding to the button determined that the finger merely passes across it. When the priority is to be subdivided, as illustrated in the example of FIG. 18, the priority is associated with each character stored in the temporary buffer 13 in the character-input determination process illustrated in FIG. 16A and FIG. 16B.

In this case, for example, the highest priority may be associated with a button to which a tap is input. That is, higher priority than that when a specific operation is input may be associated with the button. This is because the user actively inputs an operation for selecting a button and therefore the button is more likely to be the one that is intentionally touched.

As for a character corresponding to the button determined that the finger merely passes across it, for example, if an angular difference between a moving direction when the finger enters the button and a moving direction when the finger exits the button is larger, higher priority may be associated with the character. This is because if the angular difference is larger, it is more likely to be a button that is intentionally touched.

As for a character corresponding to the button determined that the finger merely passes across it, if the trajectory that the finger passes is closer to the center of the button, higher priority may be associated with the character. This is because if the trajectory is closer to the center of the button, it is more likely to be a button that is intentionally touched.

When the priority is subdivided in the above manner, a character with higher priority is preferentially used when the second-candidate character string is created in the character-string search process. Specifically, when a plurality of character strings match the first-candidate character string in which characters with priority of "1" are combined, first of all, the first-candidate character string is complemented with a character with priority of "2", and the search result is tried to be narrowed down. If a plurality of character strings match the first-candidate character string even if it is complemented with the character with priority of "2", then the first-candidate character string is further complemented with a character with priority of "3", and the search result is tried to be narrowed down.

Hereinafter the same as above, characters are used for complementation in descending order of priorities until the search result is narrowed down to one. In this way, by subdividing the priority, a character string as an object to be verified can be generated by combining characters in the order of higher probability that the character is intentionally touched, thus improving identification precision of an input character string.

As explained above, the main control unit 10 moves the position of a tap area according to the position touched by the finger. A setting process (tap-position setting process) of the position of a tap area will be explained below with reference to FIG. 19 and FIG. 20. FIG. 19 is a diagram illustrating an example of the setting process of a tap area. A relation between a position touched by the finger and a tap area is set by previously performing the setting process.

First of all, at s230, an operation for activating a process of setting a display position of a tap area, that is, a process of setting a relation between a position touched by the finger and a tap area is input. In this case, the mobile phone 1 displays a screen for setting of a tap position. The screen for setting of a tap position displays a line to be followed by the user and a message indicating "If 0 appears while tracing the trajectory by the finger, tap near the trajectory by another finger".

At s231, the finger is placed on the touch panel 2, and a touch position is moved with the finger kept in contact with the touch panel 2 and a displayed trajectory is traced by the finger. In this case, the mobile phone 1 detects a finger touch position and determines that the touch is started and the touch position is moving along the trajectory.

At s232, a movement distance and/or a movement time required for tracing the displayed trajectory by the finger become predetermined conditions or more. In this case, the mobile phone 1 determines that the condition to display a mark is satisfied, and displays a ○ (circle) mark (filled circle mark in FIG. 19) on the screen.

At s233, in addition to the finger tracing the trajectory, another finger (second finger) touches the touch panel 2. In this case, the mobile phone 1 detects two touch positions, a position touched by the finger tracing the trajectory and a position touched by the another finger. Furthermore, the mobile phone 1 displays another ○ mark at a position touched by the another finger. At s233, the mobile phone 1 detects that the another finger touches the mark and then terminates the display of the ◯ mark (filled circle mark in FIG. 19).

At s234, a movement distance and/or a movement time required for tracing the displayed trajectory by the finger become predetermined conditions or more. In this case, the mobile phone 1 determines that the conditions to display the mark is satisfied, and again displays the ◯ mark (filled circle mark in FIG. 19) on the screen.

At s235, in addition to the finger tracing the trajectory, another finger (second finger) touches the touch panel 2. In this case, the mobile phone 1 detects two touch positions, a position touched by the finger tracing the trajectory and a position touched by the another finger. At s235, the mobile phone 1 detects that the another finger touches the mark and then terminates the display of the ◯ mark (filled circle mark in FIG. 19).

At s236, setting of the position of a tap area is completed based on the operations at s231 to s235. In this case, the mobile phone 1 displays a message indicating Setting Completed on the touch panel.

In FIG. 19, the number of display times of the ◯ mark (filled circle mark in FIG. 19) is set to twice and the number of touches by another finger is set to twice; however, the number of display times of the 0 mark (filled circle mark in FIG. 19) and the number of touches by another finger are not particularly limited.

Then a procedure of a tap-area setting process (i.e. tap-position setting process) will be explained below with reference to a flowchart illustrated in FIG. 20. When an operation of activating the tap-area setting process is input, then at Step S110, the main control unit 10 updates the display to display the screen for setting a tap area. After the update of the display, at Step S112, the main control unit 10 detects a gesture of tracing the trajectory based on the detection result of the touch panel 2. In other words, the main control unit 10 detects a movement of the finger touch position based on the detection result of the touch panel 2.

When detecting the gesture of tracing the trajectory, then at Step S114, the main control unit 10 determines whether the it is predetermined timing based on the detection result of the touch panel 2. The main control unit 10 makes the determination by comparing a time since the start of the trace, a movement distance from the start position of the trace, a touch position, and the like with preset conditions.

When the detection result of the touch panel 2 does not satisfy the conditions and it is not the predetermined timing (No at Step S114), the main control unit 10 proceeds to Step S124.

When the detection result of the touch panel 2 satisfies the conditions and it is the predetermined timing (Yes at Step S114), then at Step S116, the main control unit 10 displays a mark prompting the user to input a tap gesture. That is, the main control unit 10 displays the mark described at s232 and s235.

When the mark is displayed, then at Step S118, the main control unit 10 detects a tap, that is, a tap gesture based on the detection result of the touch panel 2. That is, the main control unit 10 detects a touch detected at a different position from the touch position at which the trajectory is traced as a position where the tap gesture is input.

When detecting the tap, then at Step S120, the main control unit 10 saves a distance between the trajectory and the tap position and a positional relation therebetween to a buffer of the main control unit 10, the storage unit 9, or the like, to temporarily store the detected relation. Thereafter, at Step S122, the main control unit 10 calculates an average value of display positions of the tap area. That is, the main control unit 10 calculates average values of the distance between the trajectory and the tap position and the positional relation between the trajectory and the tap position saved to the buffer or the like at Step S120. Furthermore, the main control unit 10 calculates an average distance between the touch position on the trajectory and the position where the tap gesture is input and an average positional relation therebetween (direction on the touch panel 2) based on the calculated average values of the distance and the positional relation, and calculates an average value of the positions where the tap gesture is input to the calculated position on the trajectory as an average value of display positions of the tap area.

When the average value of the display positions of the tap area is set at Step S122, or when it is determined that it is not the predetermined timing at Step S114 (No at Step S114), then at Step S124, the main control unit 10 detects whether the trajectory tracing has been completed based on the detection result of the touch panel 2. For example, if a touch for tracing the trajectory reaches an end point of the trajectory displayed on the touch panel 2, the main control unit 10 determines that the trajectory tracing has been completed. When the touch for tracing the trajectory is in the middle of the trajectory displayed on the touch panel 2, the main control unit 10 determines that the trajectory tracing has not been completed.

When the trajectory tracing has not been completed (No at Step S124), the main control unit 10 proceeds to Step S114, where the processes are repeated. When the trajectory tracing has been completed (Yes at Step S124), then at Step S126, the main control unit 10 displays Setting Completed, writes calculated data (the value calculated at Step S122) to the memory (the tap-area display data 9F in the storage unit 9), and ends the tap-position setting process.

Figure 20:
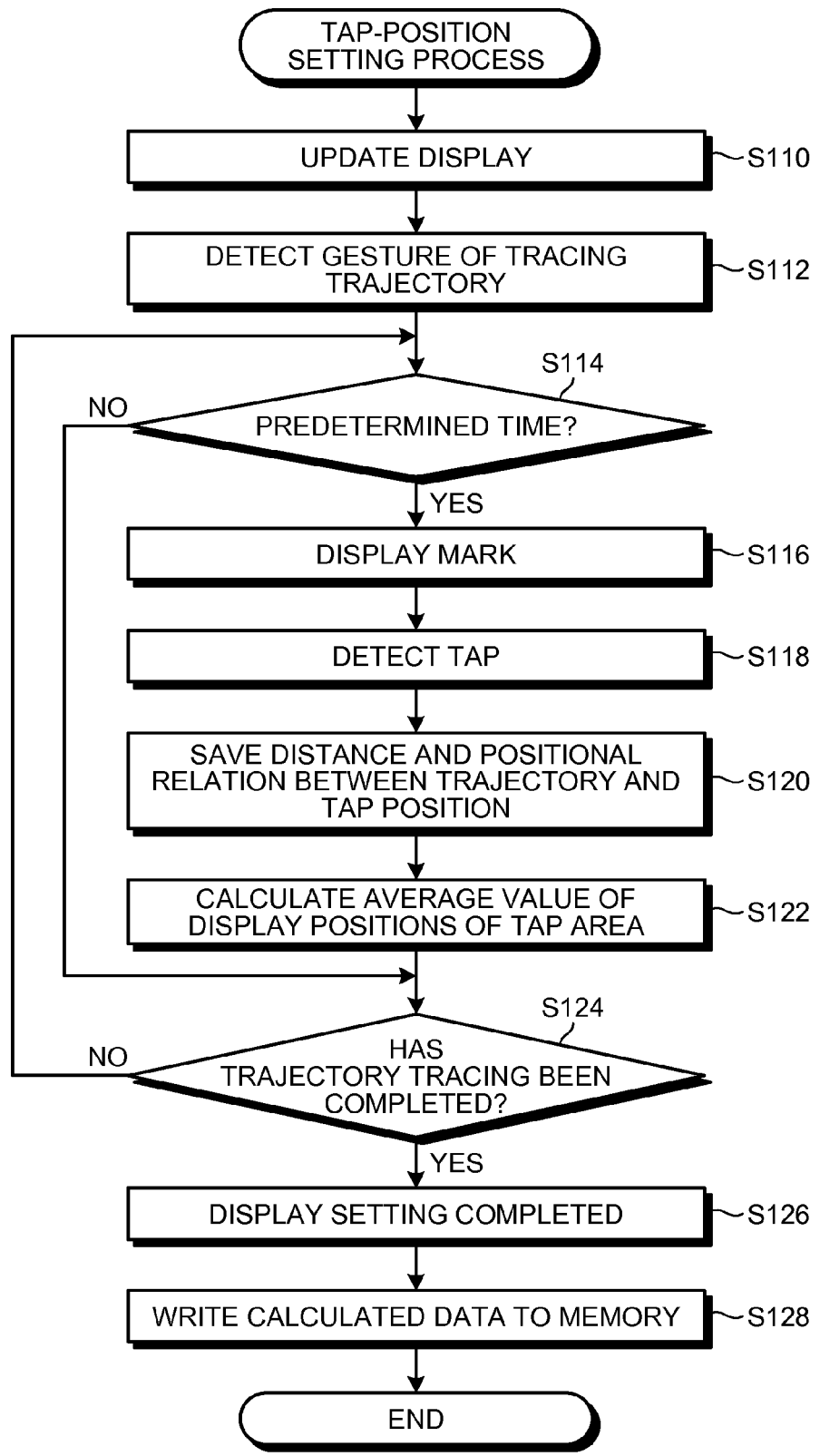
FIG. 20 is a flowchart illustrating a procedure of a tap-area setting process performed by the mobile phone.

The mobile phone 1 can calculate a relation between the position touched by the finger tracing the trajectory and the position touched by the finger inputting a tap based on the setting process in FIG. 19 and FIG. 20, and therefore can set the tap area at any position which suits user's use patterns. This enables the mobile phone 1 to set a position where the user easily inputs a tap gesture as a tap area.

In the embodiment, the tap area is calculated from the average value; however, the present invention is not limited thereto. For example, the position of the tap area may be determined based on a maximum value or a minimum value.

In the embodiment, the image is displayed in the tap area when characters are input; however, it is not limited thereto, and therefore the image does not have to be displayed. In other words, the setting of a position of the tap area may be changed corresponding to a touch for drawing a trajectory without displaying the image.

In the embodiment, to make the tap area more visible and to make the input of a tap gesture easier, the tap area is moved based on the touch position on the touch panel 2; however, the tap area may be fixed. That is, a fixed position on the touch panel 2 may be set as a tap area regardless of any button of the keyboard touched.

In the embodiment, the tap area is a given display area; however, the area does not have to be specified. That is, the main control unit 10 may set so that it is determined that a tap is input when a touch gesture is detected at another position of the touch panel 2 while detecting a gesture (first touch gesture) of moving the touch position with the finger kept in contact with the touch panel 2. In this way, by setting the touch gesture at the second position as the second touch gesture, there is no need for the process of, for example, setting the display position. This makes the process simpler.

In addition, the user can input a tap gesture by touching anywhere the user wants on the touch panel 2.

In the character input process explained with reference to FIG. 11, a searched character string is displayed in the input-character-string candidate display area 14 each time the main control unit 10 acquires a new detection result from the touch panel 2. However, instead of performing such a display until a character input at a time is completed, a searched character string may be displayed in the input-character-string candidate display area 14 only when a plurality of character strings are searched in the character-string search process after the completion of the character input at a time.

As for the matching process with the dictionary data 9E in the character-string search process explained with reference to FIG. 17, another matching method such as exact match and forward match may be used. By using an input prediction technology, a character string intended to be input by the user may be predicted, and a predicted character string may be treated as a search result. The input prediction technology is a technology in which a character string intended to be input by the user is predicted from character strings that have been already input and from a character string that is being input based on the strength of combination of the character string, the frequency of use thereof, and the like.

In the embodiment, when a position where the touch is started and a position where the touch is terminated correspond to a button, because a character corresponds to the button is quite likely to be input, higher priority is given to the button, that is, the probability of determining that it is a character to be input is increased; however, the present invention is not limited thereto. The mobile phone 1 should determine a character corresponding to the button where a tap with another finger is detected as an input character (character with high priority) during passage of the position touched by the finger drawing a trajectory (moving while keeping in contact with the touch panel 2). Therefore, priorities given to other operations and input determination criteria are not particularly limited.

In the embodiment, a character string is identified, in which a character corresponding to a button displayed at a position where a specific operation is detected, among characters corresponding to buttons displayed on the trajectory along which the finger moves while keeping in contact with the touch panel 2, is preferentially input. However, the present invention is not limited thereto, and therefore it may be configured to receive a character string including characters corresponding to buttons on the trajectory along which the finger moves while keeping in contact with the touch panel 2 or to buttons displayed near the trajectory as an input character string.

In the embodiment, the gesture of touching the touch panel 2 in a button area, the gesture of releasing the finger from the touch panel 2 in the button area, and other gestures are explained as the specific operations. However, these gestures are only examples of the specific operation, and other gestures may be treated as the specific operation.

In the embodiment, a case in which the software keyboard is AIUEO (50 hiragana characters) keyboard and a case in which it is a keyboard with QWERTY layout are explained. However, the present invention is not limited thereto, and therefore any keyboard in various key layouts can be used. For example, a Dvorak layout keyboard, a thumb shift layout (NICOLA layout) keyboard, a DSK layout keyboard, a JIS layout keyboard, and the like can be used. In addition, as explained above, these keyboards can be used for both Kana-character input and Roman-character input. They can be used not only for Japanese-character input but also be used for Alphabetical-character input. In the present embodiment, although the case of inputting Japanese language is explained, the present invention is not limited thereto. The mobile phone 1 can be used for inputting various languages. The languages include, for example, English, German, French, Chinese, and Korean.

INDUSTRIAL APPLICABILITY

As explained above, the character input device and the character input method according to the present invention are useful for a character input, and are particularly suitable for the case in which characters need to be input at high speed using a touch panel.

The invention claimed is:

1. A character input device, comprising:
a touch panel capable of detecting touches on a plurality of points; and
a control unit for displaying a plurality of buttons on the touch panel and determining whether a first touch gesture in which a touch position with respect to the touch panel is continuously changed occurs, wherein,
when detecting occurrence of a second touch gesture being a further touch on a different area from an area where the first touch gesture occurs while the first touch gesture occurs in the area where the buttons are displayed,
the control unit is configured to receive, as an input, a character corresponding to the button corresponding to the touch position of the first touch gesture when the second touch gesture occurs, and
the control unit is configured to
display an additional display including the character corresponding to the button corresponding to the touch position of the first touch gesture in the different area, and
detect a touch on the additional display as the second touch gesture.

2. The character input device according to claim 1, wherein the control unit is configured to display the additional display at positions, each time the touch position detected by the first touch gesture changes, each of which is equally spaced with respect to each of the touch positions.

3. The character input device according to claim 1, wherein the control unit is configured to further receive, as an input, a character corresponding to a button displayed at a position where a specific operation is detected by the first touch gesture, among characters corresponding to buttons on a trajectory connecting positions where touches are detected by the first touch gesture.

4. The character input device according to claim 3, wherein the specific operation is a start of a touch in the first touch gesture.

5. The character input device according to claim 3, wherein the specific operation is an end of a touch in the first touch gesture.

6. The character input device according to claim 3, wherein the specific operation is a change of a movement direction of the touch position in the first touch gesture.

7. The character input device according to claim 3, wherein the specific operation is a movement of the touch position which draws a trajectory of a specific shape in the first touch gesture.

8. The character input device according to claim 3, wherein the control unit is configured to
determine whether a character string, in which a character corresponding to a button where the touch occurs by the first touch gesture upon detection of the second touch gesture is combined with a character corresponding to a button displayed at a position where the specific operation is detected, is appropriate, and receive, when it is detected that the character string is not appropriate, a character string complemented with a character corresponding to a button which is other than the button where the touch occurs by the first touch gesture upon detection of the second touch gesture and which is other than the button where the specific operation is detected, as an input.

9. The character input device according to claim 3, wherein the control unit is configured to compare a character string in which characters corresponding to buttons displayed at positions where the specific operation is detected are combined with each other with a dictionary, and receive, when a matched character string is found, the matched character string as an input.

10. The character input device according to claim 1, wherein the control unit is configured to associate weighting information with each of characters corresponding to buttons where touches occur by the first touch gesture, and give higher priority to a character associated with weighting information having a large value, to specify an input character string.

11. The character input device according to claim 10, wherein the control unit is configured to associate a character corresponding to a button where a touch occurs by the first touch gesture upon detection of the second touch gesture with weighting information greater than that of a character corresponding to a button where the touch occurs by the first touch gesture but the second touch gesture is not detected.

12. A character input method executed by a character input device with a touch panel capable of detecting touches on a plurality of points, the character input method comprising:

displaying a plurality of buttons on the touch panel;

detecting occurrence of a first touch gesture in which a touch position continuously changes, and a second touch gesture being a further touch on a different area from an area where the first touch gesture occurs while the first touch gesture occurs in the area where the buttons are displayed;

receiving, as an input, a character corresponding to the button corresponding to the touch position of the first touch gesture when the second touch gesture occurs;

displaying an additional display including the character corresponding to the button corresponding to the touch position of the first touch gesture in the different area; and detecting a touch on the additional display as the second touch gesture.

* * * * *